US012652561B2

(12) United States Patent
Pirmagomedov et al.

(10) Patent No.: US 12,652,561 B2
(45) Date of Patent: Jun. 9, 2026

(54) MACHINE LEARNING MODEL SELECTION FOR BEAM PREDICTION FOR WIRELESS NETWORKS

(71) Applicant: Nokia Technologies Oy, Espoo (FI)

(72) Inventors: Rustam Pirmagomedov, Oulu (FI);
Andrea Bonfante, Massy (FR);
Laxmanarao Gumaste, Bangalore (IN)

(73) Assignee: NOKIA TECHNOLOGIES OY,
Espoo (FI)

( * ) Notice: Subject to any disclaimer, the term of this patent is extended or adjusted under 35 U.S.C. 154(b) by 322 days.

(21) Appl. No.: 18/468,214

(22) Filed: Sep. 15, 2023

(65) Prior Publication Data

US 2024/0107347 A1 Mar. 28, 2024

(30) Foreign Application Priority Data

Sep. 23, 2022 (IN) .............................. 202241054578

(51) Int. Cl.
*H04W 24/08* (2009.01)
*H04W 24/02* (2009.01)

(52) U.S. Cl.
CPC ........... *H04W 24/08* (2013.01); *H04W 24/02* (2013.01)

(58) Field of Classification Search
CPC ........ G06N 3/045; G06N 3/08; H04B 7/0695; H04B 7/06952; H04B 7/088; H04L 1/0023; H04W 24/02; H04W 24/08
See application file for complete search history.

(56) References Cited

U.S. PATENT DOCUMENTS

| | | | | |
|---|---|---|---|---|
| 10,666,342 | B1 * | 5/2020 | Landis .................... | G06N 3/045 |
| 2020/0358514 | A1 * | 11/2020 | Landis .............. | H04B 17/3913 |
| 2021/0328630 | A1 * | 10/2021 | Ryu .......................... | H04B 1/44 |
| 2022/0231883 | A1 * | 7/2022 | Chou .................. | H04L 25/0222 |
| 2022/0248312 | A1 * | 8/2022 | Bai ........................ | G06N 20/20 |

(Continued)

OTHER PUBLICATIONS

"Deep Learning-based Predictive Beam Management for 5G mmWave Systems"; Ozge et al.; 2021 IEEE Wireless Communications and Networking Conference (WCNC) (Year: 2021).*

(Continued)

*Primary Examiner* — Benjamin H Elliott, IV
(74) *Attorney, Agent, or Firm* — Carter, DeLuca & Farrell LLP

(57) ABSTRACT

A method includes beam prediction inference using a first machine learning (ML) model based algorithm that uses a first quantity of reference signal (RS) measurements; transmitting an indication that the first user device is using the first ML model based algorithm that uses the first quantity of RS measurements; receiving, based on beam change dynamics event information received by the network node from one or more other user devices that have one or more corresponding conditions within a threshold to the first user device, a request for the first user device to either: change to a non-ML model based algorithm to perform beam selection or a second ML model based algorithm that uses a second quantity of reference signal measurements to perform beam prediction inference, wherein the second quantity is different than the first quantity, or concurrently perform beam prediction inferences using the first and second ML model based algorithms.

1 Claim, 12 Drawing Sheets

(56)     References Cited

U.S. PATENT DOCUMENTS

| 2023/0198604 | A1* | 6/2023 | Bhamri | H04B 7/0695 |
| | | | | 375/347 |
| 2023/0421224 | A1* | 12/2023 | Lee | H04B 7/0696 |
| 2024/0056833 | A1* | 2/2024 | Bai | H04B 7/0632 |
| 2024/0063962 | A1* | 2/2024 | Lin | H04L 5/0094 |
| 2024/0107347 | A1* | 3/2024 | Pirmagomedov | H04L 1/0023 |
| 2024/0314591 | A1* | 9/2024 | Zheng | H04W 48/08 |
| 2025/0007597 | A1* | 1/2025 | Zhu | H04B 7/0404 |
| 2025/0047399 | A1* | 2/2025 | Wang | H04L 1/1829 |
| 2025/0062809 | A1* | 2/2025 | Li | H04L 5/005 |
| 2025/0167852 | A1* | 5/2025 | Li | H04B 7/0626 |
| 2025/0167905 | A1* | 5/2025 | Li | H04L 41/147 |
| 2025/0175271 | A1* | 5/2025 | Li | H04L 5/0048 |
| 2025/0184764 | A1* | 6/2025 | Li | H04L 25/0254 |
| 2025/0193087 | A1* | 6/2025 | Li | H04B 17/328 |
| 2025/0202551 | A1* | 6/2025 | Li | H04L 5/0048 |
| 2025/0247189 | A1* | 7/2025 | Wang | H04L 41/16 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"3rd Generation Partnership Project; Technical Specification Group Radio Access Network; NR; Multiplexing and channel coding (Release 17)", 3GPP TS 38.212, V17.2.0, Jun. 2022, pp. 1-201.

Extended European Search Report received for corresponding European Patent Application No. 23192432.5, dated Feb. 12, 2024, 9 pages.

* cited by examiner

Example Wireless Network 130

Figure 2:
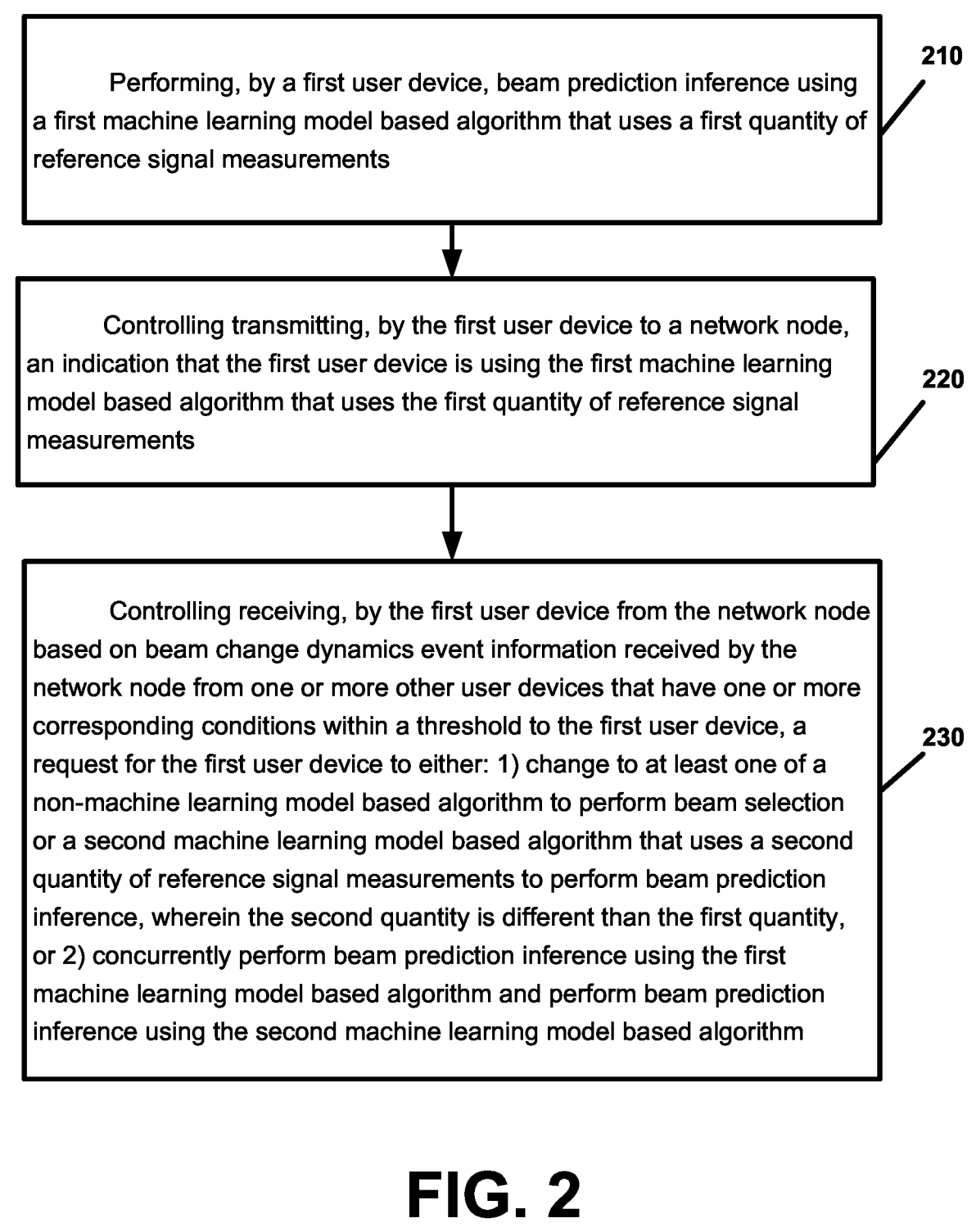

Performing, by a first user device, beam prediction inference using a first machine learning model based algorithm that uses a first quantity of reference signal measurements

210

Controlling transmitting, by the first user device to a network node, an indication that the first user device is using the first machine learning model based algorithm that uses the first quantity of reference signal measurements

220

Controlling receiving, by the first user device from the network node based on beam change dynamics event information received by the network node from one or more other user devices that have one or more corresponding conditions within a threshold to the first user device, a request for the first user device to either: 1) change to at least one of a non-machine learning model based algorithm to perform beam selection or a second machine learning model based algorithm that uses a second quantity of reference signal measurements to perform beam prediction inference, wherein the second quantity is different than the first quantity, or 2) concurrently perform beam prediction inference using the first machine learning model based algorithm and perform beam prediction inference using the second machine learning model based algorithm

Figure 3:
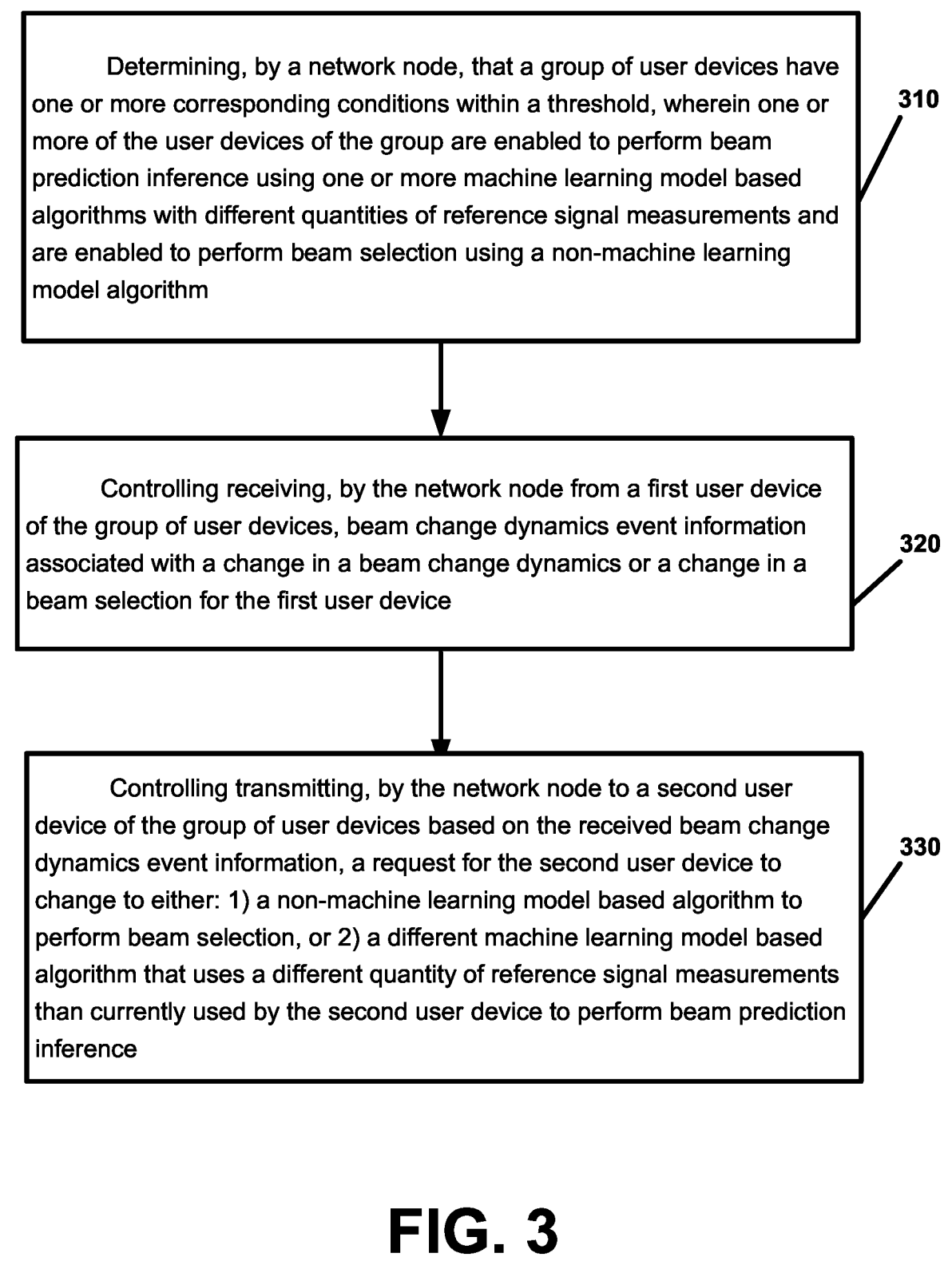

Determining, by a network node, that a group of user devices have one or more corresponding conditions within a threshold, wherein one or more of the user devices of the group are enabled to perform beam prediction inference using one or more machine learning model based algorithms with different quantities of reference signal measurements and are enabled to perform beam selection using a non-machine learning model algorithm

310

Controlling receiving, by the network node from a first user device of the group of user devices, beam change dynamics event information associated with a change in a beam change dynamics or a change in a beam selection for the first user device

320

Controlling transmitting, by the network node to a second user device of the group of user devices based on the received beam change dynamics event information, a request for the second user device to change to either: 1) a non-machine learning model based algorithm to perform beam selection, or 2) a different machine learning model based algorithm that uses a different quantity of reference signal measurements than currently used by the second user device to perform beam prediction inference

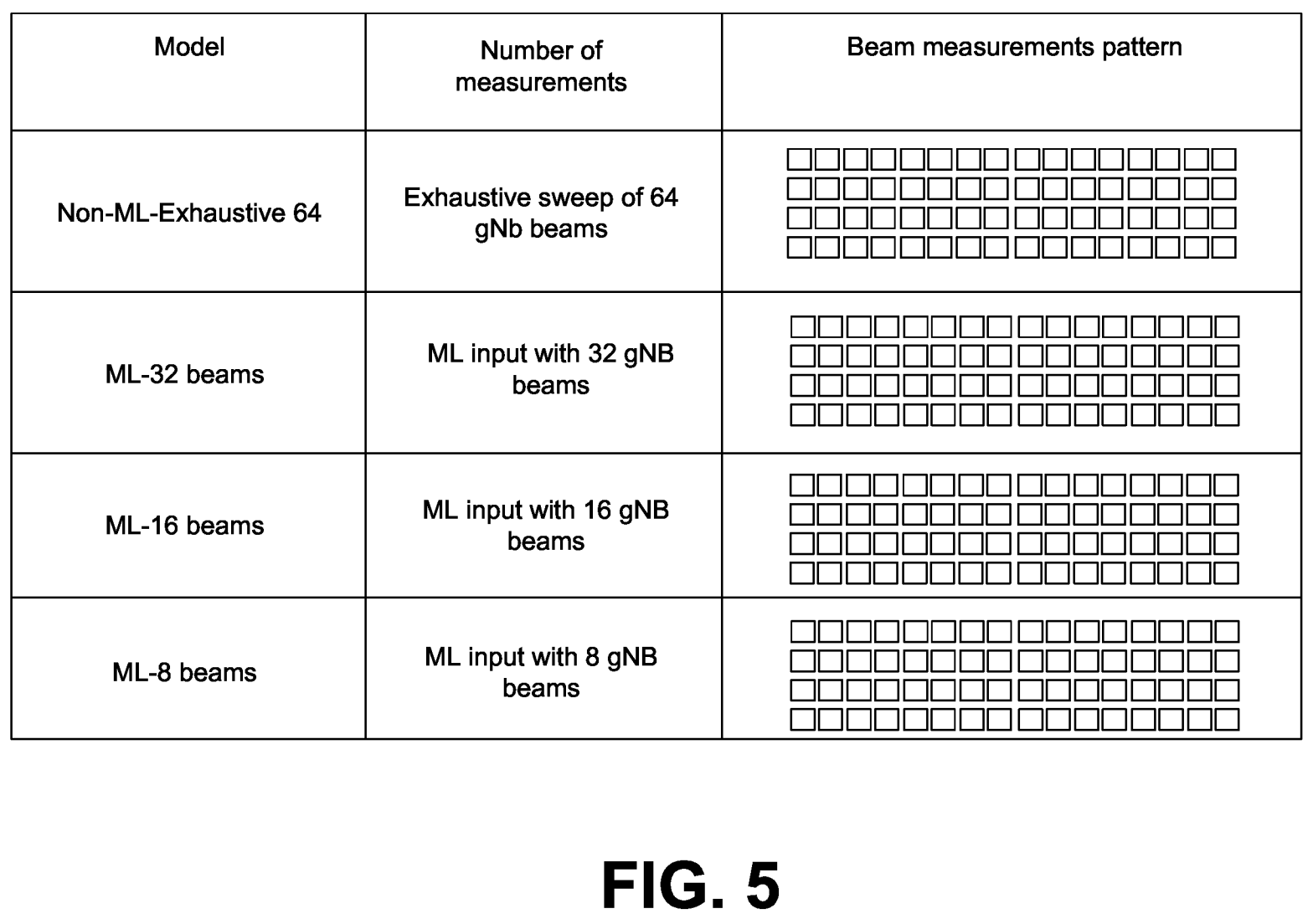

| Model | Number of measurements | Beam measurements pattern |
|---|---|---|
| Non-ML-Exhaustive 64 | Exhaustive sweep of 64 gNb beams | |
| ML-32 beams | ML input with 32 gNB beams | |
| ML-16 beams | ML input with 16 gNB beams | |
| ML-8 beams | ML input with 8 gNB beams | |

FIG. 5

MACHINE LEARNING MODEL SELECTION FOR BEAM PREDICTION FOR WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include performing, by a first user device, beam prediction inference using a first machine learning model based algorithm that uses a first quantity of reference signal measurements; controlling transmitting, by the first user device to a network node, an indication that the first user device is using the first machine learning model based algorithm that uses the first quantity of reference signal measurements; and, controlling receiving, by the first user device from the network node based on beam change dynamics event information received by the network node from one or more other user devices that have one or more corresponding conditions within a threshold to the first user device, a request for the first user device to either: 1) change to at least one of a non-machine learning model based algorithm to perform beam selection or a second machine learning model based algorithm that uses a second quantity of reference signal measurements to perform beam prediction inference, wherein the second quantity is different than the first quantity, or 2) concurrently perform beam prediction inference using the first machine learning model based algorithm and perform beam prediction inference using the second machine learning model based algorithm.

According to an example embodiment, a method may include determining, by a network node, that a group of user devices have one or more corresponding conditions within a threshold, wherein one or more of the user devices of the group are enabled to perform beam prediction inference using one or more machine learning model based algorithms with different quantities of reference signal measurements and are enabled to perform beam selection using a non-machine learning model algorithm; controlling receiving, by the network node from a first user device of the group of user devices, beam change dynamics event information associated with a change in a beam change dynamics or a change in a beam selection for the first user device; and, controlling transmitting, by the network node to a second user device of the group of user devices based on the received beam change dynamics event information, a request for the second user device to change to either: 1) a non-machine learning model based algorithm to perform beam selection, or 2) a different machine learning model based algorithm that uses a different quantity of reference signal measurements than currently used by the second user device to perform beam prediction inference.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 2 is a flow chart illustrating operation of a user device or UE.

FIG. 3 is a flow chart illustrating operation of a gNB or network node.

FIG. 5 is a diagram illustrating a plurality of different ML model based algorithms for beam prediction inference and a non-ML based algorithm for beam selection.

DETAILED DESCRIPTION

Figure 1:
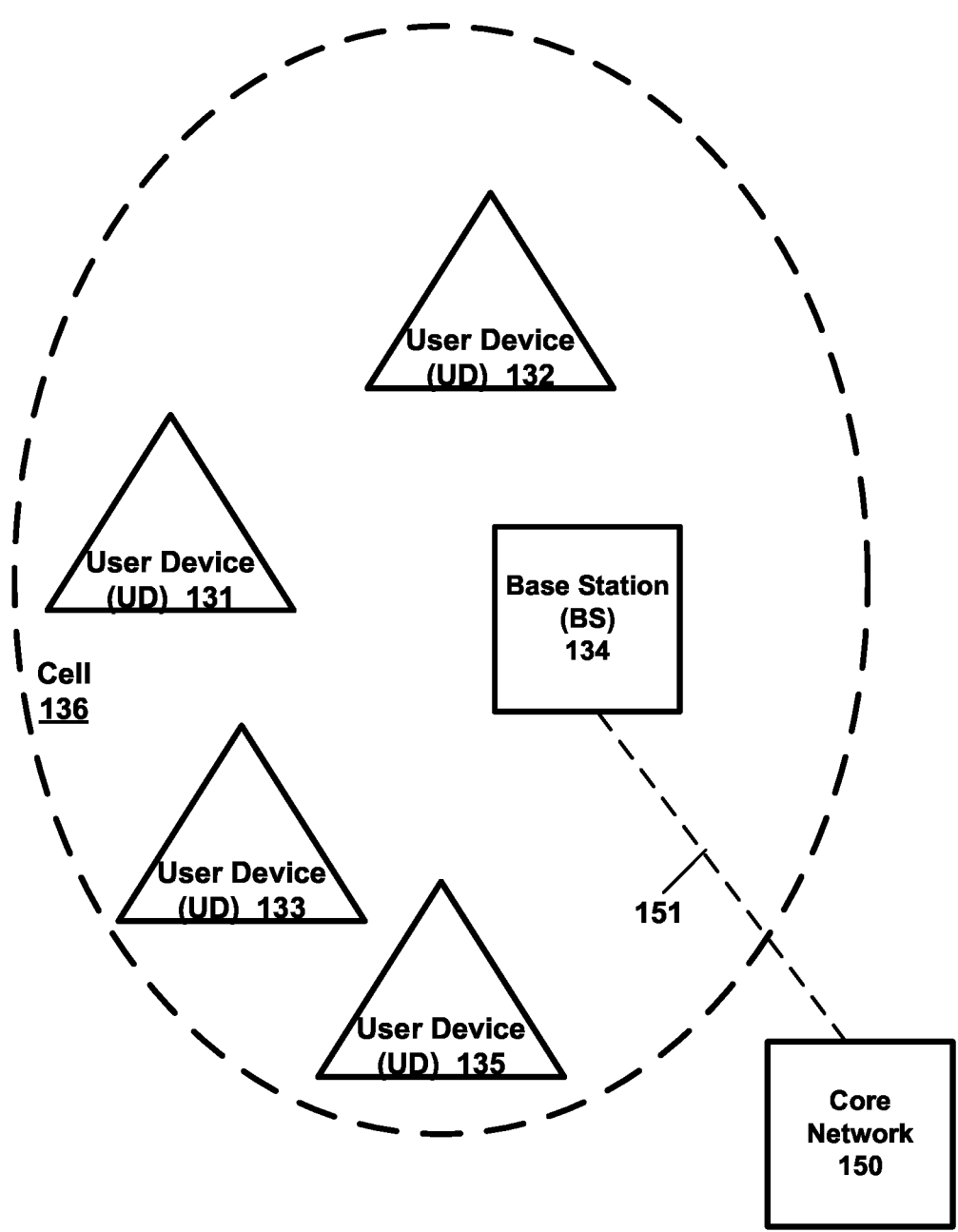
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a /centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Commu-
nications (MTC, or Machine to Machine communications)
may, for example, be characterized by fully automatic data
generation, exchange, processing and actuation among intel-
ligent machines, with or without intervention of humans.
Enhanced mobile broadband (eMBB) may support much
higher data rates than currently available in LTE.

Ultra-reliable and low-latency communications (URLLC)
is a new data service type, or new usage scenario, which may
be supported for New Radio (5G) systems. This enables
emerging new applications and services, such as industrial
automations, autonomous driving, vehicular safety, e-health
services, and so on. 3GPP targets in providing connectivity
with reliability corresponding to block error rate (BLER) of
10-5 and up to 1 ms U-Plane (user/data plane) latency, by
way of illustrative example. Thus, for example, URLLC user
devices/UEs may require a significantly lower block error
rate than other types of user devices/UEs as well as low
latency (with or without requirement for simultaneous high
reliability). Thus, for example, a URLLC UE (or URLLC
application on a UE) may require much shorter latency, as
compared to an eMBB UE (or an eMBB application running
on a UE).

The techniques described herein may be applied to a wide
variety of wireless technologies or wireless networks, such
as 5G (New Radio (NR)), cmWave, and/or mmWave band
networks, IoT, MTC, eMTC, eMBB, URLLC, 6G, etc., or
any other wireless network or wireless technology. These
example networks, technologies or data service types are
provided only as illustrative examples.

According to an example embodiment, a machine learn-
ing (ML) model may be used within a wireless network to
perform (or assist with performing) one or more tasks. In
general, one or more nodes (e.g., BS, gNB, eNB, RAN node,
user node, UE, user device, relay node, or other wireless
node) within a wireless network may use or employ a ML
model, e.g., such as, for example a neural network model
(e.g., which may be referred to as a neural network, an
artificial intelligence (AI) neural network, an AI neural
network model, an AI model, a machine learning (ML)
model or algorithm, a model, or other term) to perform, or
assist in performing, one or more ML-enabled tasks. Other
types of models may also be used. A ML-enabled task may
include tasks that may be performed (or assisted in perform-
ing) by a ML model, or a task for which a ML model has
been trained to perform or assist in performing).

ML-based algorithms or ML models may be used to
perform and/or assist with performing a variety of wireless
and/or radio resource management (RRM) functions or tasks
to improve network performance, such as, e.g., in the UE for
beam prediction (e.g., predicting a best beam or best beam
pair based on measured reference signals), antenna panel or
beam control, RRM measurements and feedback (channel
state information (CSI) feedback), link monitoring, Transmit
Power Control (TPC), etc. In some cases, the use of ML
models may be used to improve performance of a wireless
network in one or more aspects or as measured by one or
more performance indicators or performance criteria.

Models (e.g., neural networks or ML models) may be or
may include, for example, computational models used in
machine learning made up of nodes organized in layers. The
nodes are also referred to as artificial neurons, or simply
neurons, and perform a function on provided input to
produce some output value. A neural network or ML model
may typically require a training period to learn the param-
eters, i.e., weights, used to map the input to a desired output.
The mapping occurs via the function. Thus, the weights are
weights for the mapping function of the neural network.
Each neural network model or ML model may be trained for
a particular task.

To provide the output given the input, the neural network
model or ML model should be trained, which may involve
learning the proper value for a large number of parameters
(e.g., weights) for the mapping function. The parameters are
also commonly referred to as weights as they are used to
weight terms in the mapping function. This training may be
an iterative process, with the values of the weights being
tweaked over many (e.g., thousands) of rounds of training
until arriving at the optimal, or most accurate, values (or
weights). In the context of neural networks (neural network
models) or ML models, the parameters may be initialized,
often with random values, and a training optimizer itera-
tively updates the parameters (weights) of the neural net-
work to minimize error in the mapping function. In other
words, during each round, or step, of iterative training the
network updates the values of the parameters so that the
values of the parameters eventually converge on the optimal
values.

Neural network models or ML models may be trained in
either a supervised or unsupervised manner, as examples. In
supervised learning, training examples are provided to the
neural network model or other machine learning algorithm.
A training example includes the inputs and a desired or
previously observed output. Training examples are also
referred to as labeled data because the input is labeled with
the desired or observed output. In the case of a neural
network, the network learns the values for the weights used
in the mapping function that most often result in the desired
output when given the training inputs. In unsupervised
training, the neural network model learns to identify a
structure or pattern in the provided input. In other words, the
model identifies implicit relationships in the data. Unsuper-
vised learning is used in many machine learning problems
and typically requires a large set of unlabeled data.

According to an example embodiment, the learning or
training of a neural network model or ML model may be
classified into (or may include) two broad categories (super-
vised and unsupervised), depending on whether there is a
learning "signal" or "feedback" available to a model. Thus,
for example, within the field of machine learning, there may
be two main types of learning or training of a model:
supervised, and unsupervised. The main difference between
the two types is that supervised learning is done using
known or prior knowledge of what the output values for
certain samples of data should be. Therefore, a goal of
supervised learning may be to learn a function that, given a
sample of data and desired outputs, best approximates the
relationship between input and output observable in the data.
Unsupervised learning, on the other hand, does not have
labeled outputs, so its goal is to infer the natural structure
present within a set of data points.

Supervised learning: The computer is presented with
example inputs and their desired outputs, and the goal may
be to learn a general rule that maps inputs to outputs.
Supervised learning may, for example, be performed in the
context of classification, where a computer or learning
algorithm attempts to map input to output labels, or regres-
sion, where the computer or algorithm may map input(s) to
a continuous output(s). Common algorithms in supervised
learning may include, e.g., logistic regression, naive Bayes,
support vector machines, artificial neural networks, and
random forests. In both regression and classification, a goal
may include to find specific relationships or structure in the
input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also may optimize its choice of objects to acquire labels for. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there may be no specific way to compare model performance in most unsupervised learning methods.

It may be advantageous to provide techniques that may enable use of ML models, coordinate use of ML models, allow configuration of ML models, allow modification or training of a ML model, and/or facilitate distribution or communication of ML models or ML-assisted functionalities across wireless networks, e.g., between gNBs or RAN nodes and UEs, for various wireless-network related tasks. Some example tasks that a ML model may be used for may include, e.g., channel state information (CSI) feedback enhancement, e.g., overhead reduction, improved accuracy, beam prediction; beam management, e.g., beam prediction in time, and/or spatial domain for overhead and latency reduction, beam selection accuracy improvement; and/or UE positioning accuracy enhancements for different scenarios including, e.g., those with heavy NLOS (non-line of sight) conditions. These are just a few examples, and ML models may be applied or used to perform or assist in performing a wide variety of tasks within a wireless network.

Beamforming may be used for transmitting and/or receiving a signal. By adjusting a weight (e.g., amplitude and/or phase) of each antenna element of an antenna panel or antenna system, a node (e.g., network node and/or UE) may provide directivity in which transmission power may be directed in a specific direction via beamforming, for transmitting a signal. Thus, beamforming may allow a node to provide transmitter-side directivity, where a transmitting node (e.g., a gNB or network node, or a UE or user device) may apply a weight or a set of weights to antenna elements to form a beam for transmitting a signal. Likewise, beamforming may also be used to provide receiver-side directivity, where a receiving node may apply a weight or set of weights to antenna elements to form a receive beam. Because each beam may typically cover only a limited area or direction, multiple beams (e.g., with each beam pointed in a different direction) are typically required to cover a full range of directions. Example beams may include synchronization signal block reference signal (SSB) beams, and channel state information reference signal (CSI-RS) beams, where each reference signal is associated with a different beam, as it may point in a different direction. A gNB or network node may utilize multiple beams to cover the entire service area, and one or a subset of those beams may be associated with a UE (e.g., may point in a direction towards the UE and/or may be a strongest beam (or best beam, such as the beam having a highest RSRP measurement) for communication with the UE).

Wide beams may be wider (have a wider or larger angle, to cover a larger range of angular directions) than narrow beams. Wide beams may include, e.g., SSB beams or CSI-RS beams, while narrow beams may typically include CSI-RS beams.

3GPP beam management may include procedures P1, P2 and P3 that are briefly summarized as follows:

P1 (gNB wide beam sweeping): The gNB sweeps through a set of wide angular beams assigned to different SSB/CSI-RS resources, while transmitting a signal (e.g., a SSB or a CSI-RS signal) on an associated resource of each beam. Sweeping may refer to the node generating a sequence of beams (e.g., the gNB transmitting a reference signal via each beam) across a range of beams or directions or possibly covering all directions. The UE may perform signal measurement (e.g., the UE may measure a reference signal receive power (RSRP)) on each of the different SSBs (or for different SSB beams), the UE requests access to the gNB, by transmitting (e.g., by transmitting a random access preamble) in a time-frequency location that corresponds to the SSB of the best beam.

P2 (gNB narrow beam sweeping): The gNB performs beam sweeping through a set of narrow beams assigned to different CSI-RS resources that cover the wide angular space of the SSB beam adopted (or indicated by the UE as the best wide beam) in P1. The UE performs signal measurement (e.g., measures RSRP of signals transmitted by gNB via the narrow beams) and reports to the gNB the RSRP measurements of one or more of the best or strongest gNB (or network node) transmit narrow beams using a CSI-report. The gNB may select the best gNB transmit narrow beam based on the RSRP measurements.

P3 (UE beam sweeping): the gNB uses the optimal or best gNB transmit narrow beam selected from P2 to transmit multiple CSI-RSs (multiple narrow or CSI-RS beams) while the UE sweeps through a set of UE receive narrow beams to refine the UE beam direction. The UE can make a selection of the best UE receive narrow beam based on the RSRP measurements and communicate the results to gNB.

Therefore, for example, during data transmission, the gNB (or network node) may use the best or strongest (e.g., a beam or reference signal having a highest RSRP) narrow beam found in P2, while the UE may use the best or strongest (e.g., beam or reference signal having a highest RSRP) beam found in P3. These are some example beam management procedures, and others may be used.

The three beam management procedures (P1, P2 and P3) may be inefficient for various reasons. On the one hand, sweeping all the beams in each of P1, P2 and P3 is time-consuming, and may consume significant resources that could otherwise be used for data communication. Thus, for example, at least in some cases, the above procedures may significantly increase measurement reporting, which increases signalling overhead. This reduces the system throughput and spectral efficiency. For example, data transmission opportunities may be reduced due to the resources employed for signalling and obtaining the beam measurements. Beam sweeping, e.g., across all or a full set of beams or reference signals may also add or create significant latency, e.g., such as during an initial access operation.

A UE may use or be able to use different ML models to perform or assist with beam selection or beam prediction inference. However, it may be unclear or unknown to the UE as to which ML model the UE should use to perform beam prediction inference that provides the best or most efficient use of resources, while still providing a good or acceptable beam prediction performance. It may be advantageous for the gNB or network node to provide the UE with a request to use a specific ML model to perform beam prediction inference, or for the gNB or network node to provide the UE with information that that may allow the UE to determine or select one of multiple ML models to use for beam prediction inference, or other information that may be used to determine which ML model or non-ML model based algorithm should be used for beam prediction or beam selection.

FIG. 2 is a flow chart illustrating operation of a user device (or UE). Operation 210 includes performing, by a first user device, beam prediction inference using a first machine learning model based algorithm that uses a first quantity of reference signal measurements. Operation 220 includes controlling transmitting, by the first user device to a network node, an indication that the first user device is using the first machine learning model based algorithm that uses the first quantity of reference signal measurements. And, operation 230 includes controlling receiving, by the first user device from the network node based on beam change dynamics event information received by the network node from one or more other user devices that have one or more corresponding conditions within a threshold to the first user device, a request for the first user device to either: 1) change to at least one of a non-machine learning model based algorithm to perform beam selection or a second machine learning model based algorithm that uses a second quantity of reference signal measurements to perform beam prediction inference, wherein the second quantity is different than the first quantity, or 2) concurrently perform beam prediction inference using the first machine learning model based algorithm and perform beam prediction inference using the second machine learning model based algorithm.

For the method of FIG. 2, the method may further include detecting, by the first user device, beam change dynamics event information associated with a change in a beam selection for the first user device; and controlling transmitting, by the first user device to the network node, the beam change dynamics event information associated with a change in a beam selection for the first user device.

For the method of FIG. 2, the beam change dynamics event information may include at least one of: information indicating that a rate of change or frequency of change of a best beam for the first user device is either increasing or becoming more dynamic, or is decreasing or becoming less dynamic; information indicating that a beam pattern for the first user device has changed; or information indicating one or more propagation environment changes associated with a change in beam selection for the first user device.

For the method of FIG. 2, the beam change dynamics event information may include, or may further include, information indicating at least one of the following: a beam failure has been detected by the user device; a change performed by the first user device from the first machine learning model based algorithm that uses a first quantity of reference signal measurements to perform beam prediction inference to a different machine learning model based algorithm that uses a quantity of reference signal measurements that is different than the first quantity of reference signal measurements; a change performed by the first user device from the first machine learning model based algorithm that uses a first quantity of reference signal measurements to perform beam prediction inference to the non-machine learning model based algorithm to perform beam selection; a request transmitted by the first user device to the network node for the first user device to change from the first machine learning model based algorithm that uses a first quantity of reference signal measurements to perform beam prediction inference to either the non-machine learning model based algorithm to perform beam selection or to a different machine learning model based algorithm to perform beam prediction that uses a quantity of reference signal measurements that is different than the first quantity of reference signal measurements; that a performance of beam prediction inference of the first user device based on the first machine learning model based algorithm that uses the first quantity of reference signal measurements is less than a first threshold level of performance; and/or that the performance of the first machine learning model based algorithm to perform beam prediction inference by the first user device is within a second threshold level of performance to a performance of either the non-machine learning model based algorithm or the different machine learning model based algorithm to perform beam prediction inference.

For the method of FIG. 2, the controlling receiving may include controlling receiving, by the first user device from the network node based on beam change dynamics event information received by the network node from one or more other user devices that have one or more corresponding conditions within a threshold to the first user device, the request for the first user device to change to the second machine learning model based algorithm that uses the second quantity of reference signal measurements to perform beam prediction inference.

For the method of FIG. 2, the method may further include changing, by the first user device based on the received request, to the second machine learning model based algorithm that uses the second quantity of reference signal measurements to perform beam prediction inference.

For the method of FIG. 2, the controlling receiving may include: controlling receiving, by the first user device from the network node based on beam change rate event information received by the network node from one or more other user devices that have one or more similar conditions to the first user device, the request for the first user device to concurrently perform beam prediction inference using the first machine learning model based algorithm and perform beam prediction inference using the second machine learning model based algorithm.

For the method of FIG. 2, the method may further include concurrently performing, by the user device based on the request, beam prediction inference based on the first machine learning model based algorithm and performing beam prediction inference using the second machine learning model based algorithm.

For the method of FIG. 2, the method may further include controlling transmitting, by the first user device to the network node, information indicating a mapping between values of at least one field of a message and a plurality of algorithms that may be used by the first user device to perform beam prediction inference or beam selection.

For the method of FIG. 2, a first value of the field maps to the first machine learning model based algorithm that uses the first quantity of reference signal measurements; a second value of the field maps to the second machine learning model based algorithm that uses the second quantity of reference signal measurements; and a third value of the field maps to the non-machine learning model based algorithm to perform beam selection.

For the method of FIG. 2, the one or more corresponding conditions within a threshold for the first user device and one or more other user devices may include one or more of: the first user device is of a same device model or is manufactured by a same device vendor as the one or more other user devices; the first user device has a location that is within a threshold distance to a location of the one or more other user devices; there is a spatial correlation of a channel, within a threshold, for the first user device and the one or more other user devices; there is a correlation, within a threshold, of reference signal measurements of the first user device and reference signal measurements of the one or more other user devices; the first user device and the one or more other user devices exhibit a same channel propagation characteristics, within a threshold, including one or more of the following for received reference signals: received power, phase shift.

For the method of FIG. 2, the controlling receiving the request may include controlling receiving the request to change from the first machine learning model based algorithm that uses the first quantity of reference signal measurements to the second machine learning mode based algorithm that uses the second quantity of reference signal measurements that is greater than the first quantity, based on the network node receiving beam change dynamics event information from one or more other user devices that indicates that the rate of change or frequency of change of a best beam for the one or more other user devices is increasing or becoming more dynamic, wherein the one or more other user devices have one or more corresponding conditions within a threshold to the first user device.

For the method of FIG. 2, the controlling receiving the request may include controlling receiving the request to change from the first machine learning model based algorithm that uses the first quantity of reference signal measurements to the second machine learning mode based algorithm that uses the second quantity of reference signal measurements that is less than the first quantity, based on the network node receiving beam change dynamics event information from one or more other user devices that indicates that the rate of change or frequency of change of a best beam for the one or more other user devices is decreasing or becoming less dynamic, wherein the one or more other user devices have one or more corresponding conditions within a threshold to the first user device.

FIG. 3 is a flow chart illustrating operation of a network node or gNB. Operation 310 includes determining, by a network node, that a group of user devices have one or more corresponding conditions within a threshold, wherein one or more of the user devices of the group are enabled to perform beam prediction inference using one or more machine learning model based algorithms with different quantities of reference signal measurements and are enabled to perform beam selection using a non-machine learning model algorithm. Operation 320 includes controlling receiving, by the network node from a first user device of the group of user devices, beam change dynamics event information associated with a change in a beam change dynamics or a change in a beam selection for the first user device. And, operation 330 includes controlling transmitting, by the network node to a second user device of the group of user devices based on the received beam change dynamics event information, a request for the second user device to change to either: 1) a non-machine learning model based algorithm to perform beam selection, or 2) a different machine learning model based algorithm that uses a different quantity of reference signal measurements than currently used by the second user device to perform beam prediction inference.

For the method of FIG. 3, the beam change dynamics event information may include at least one of: information indicating that a rate of change or frequency of change of a best beam for the first user device is either increasing or becoming more dynamic, or is decreasing or becoming less dynamic; information indicating that a beam pattern for the first user device has changed; or information indicating one or more propagation environment changes associated with a change in beam selection for the first user device.

For the method of FIG. 3, the beam change dynamics event information may include or may further include, information indicating at least one of the following: a beam failure has been detected by the user device; a change performed by the first user device from the first machine learning model based algorithm that uses a first quantity of reference signal measurements to perform beam prediction inference to a different machine learning model based algorithm that uses a quantity of reference signal measurements that is different than the first quantity of reference signal measurements; a change performed by the first user device from the first machine learning model based algorithm that uses a first quantity of reference signal measurements to perform beam prediction inference to the non-machine learning model based algorithm to perform beam selection; a request transmitted by the first user device to the network node for the first user device to change from the first machine learning model based algorithm that uses a first quantity of reference signal measurements to perform beam prediction inference to either the non-machine learning model based algorithm to perform beam selection or to a different machine learning model based algorithm to perform beam prediction that uses a quantity of reference signal measurements that is different than the first quantity of reference signal measurements; that a performance of beam prediction inference of the first user device based on the first machine learning model based algorithm that uses the first quantity of reference signal measurements is less than a first threshold level of performance; that the performance of the first machine learning model based algorithm to perform beam prediction inference by the first user device is within a second threshold level of performance to a performance of either the non-machine learning model based algorithm or the different machine learning model based algorithm to perform beam prediction inference.

For the method of FIG. 3, the method may further include controlling receiving, by the network node from one or more of the user devices of the group, information indicating a mapping between values of at least one field of a message and a plurality of algorithms that may be used by the one or more user devices of the group to perform beam prediction inference or beam selection.

For the method of FIG. 3, a first value of the field maps to a first machine learning model based algorithm that uses a first quantity of reference signal measurements; a second value of the field maps to a second machine learning model based algorithm that uses a second quantity of reference signal measurements that is different than the first quantity; and a third value of the field maps to the non-machine learning model based algorithm to perform beam selection.

For the method of FIG. 3, the one or more corresponding conditions within a threshold for the group of user devices may include one or more of: user devices of the group have a same device model or have a device that is manufactured by a same device vendor or manufacturer; user devices of the group have a location that is within a threshold distance to a location of one or more other user devices of the group; there is a spatial correlation, within a threshold, of a channel for user devices of the group; there is a correlation, within a threshold, of reference signal measurements of user devices of the group; the user devices of the group exhibit a same channel propagation characteristics, within a threshold, including one or more of the following for received reference signals: received power, phase shift.

The text and figures that are provided hereinbelow are provided to describe further details, operations, and/or features that may be provided or included for or as part of the methods of FIGS. 2 and/or 3.

According to an example embodiment, one or more machine learning (ML) models may be used by a UE to perform beam prediction, e.g., predict a best beam based on a set of reference signal measurements. The ML model may be trained by (or at) the UE or the network (e.g., gNB or other network node). After training, the UE may use the ML model to perform beam prediction inference, e.g., where the ML model may receive as inputs a set of beam measurements or reference signal measurements and may output a predicted (e.g., best) beam. For example, the beam or reference signal measurements may be used as inputs to the ML model, and the ML model may output a beam identifier (beam ID) or beam index of the predicted beam or best beam. For example, at least in some cases, by using a ML model to perform or assist with beam selection and/or beam prediction, fewer reference signal measurements may be required to predict a beam, at least in some cases or situations.

For example, a UE may perform beam selection using a (legacy) non-ML based algorithm that may require an exhaustive sweep and measurement of 64 beams (measurement of 64 reference signals) within one or more pf procedures P1, P2 and/or P3. However, UEs may also use a trained ML model to perform beam prediction based on fewer reference signal (or beam) measurements, such as ML models that may use 8, 16 or 32 reference signal measurements. Thus, in some cases, a UE may have or may be able to use one or more ML models for beam prediction (or beam prediction inference), e.g., where each ML model may use a different number of reference signal measurements. For example, a UE may, from time to time, use, e.g., a first ML model based algorithm that uses 8 reference signal (or beam) measurements; a second ML model based algorithm that uses 16 reference signal measurements; a third ML model based algorithm that uses 32 reference signal measurements. For each of these, the ML model may be trained, and then a set of beam measurements may be used as inputs, and the ML model may output a beam index or beam identifier of a predicted beam (e.g., a predicted best beam) to be used by the UE, for example. In addition, the UE may also be able to use the legacy non-ML model based algorithm to perform beam selection based on the full set of 64 reference signal measurements. The ML models that require or use a higher number of reference signal measurements may provide greater beam prediction accuracy, but at the expense of higher overhead, requiring more beam/reference signal transmissions and measurements. For example, a ML model based algorithm that uses 32 reference signal measurements may typically be (or may be expected to be) more accurate at beam prediction than ML model based algorithms that use 8 or 16 reference signal measurements, but at the expense of greater overhead of, e.g., requiring longer beam sweeping and/or requiring more beam/reference signal measurements, etc.

A UE may use or be able to use different ML models to perform or assist with beam selection or beam prediction inference. However, it may be unclear or unknown to a UE as to which ML model the UE should use to perform beam prediction inference that provides the best or most efficient use of resources, while still providing a good or acceptable beam prediction performance. However, the network node or gNB may have information that may not be available to the UE, which may be useful in determining which ML model based algorithm (or whether the non-ML based algorithm should be used) should be used to perform beam prediction inference. For example, the gNB or network node may receive or collect information (e.g., such as beam change dynamics event information) from other UEs that may have one or more corresponding conditions within a threshold to the current UE.

The gNB or network node may determine, e.g., based on the received beam change dynamics event information from one or more other UEs, which ML model based algorithm the UE should use to perform beam prediction inference. Therefore, the UE may receive from the gNB or network node, e.g., a request to use (or switch to) a specific ML model based algorithm for beam prediction inference, to switch to a non-ML model based algorithm for beam selection, and/or to concurrently use a first ML model based algorithm to perform beam prediction inference and to use a second ML model based algorithm to perform beam prediction inference. This may allow the UE to take advantage of information that may be collected by the gNB or network node from other UEs that may have corresponding conditions (within a threshold) to this UE, and which may be used to make more informed decisions or recommendations to the UE as to which algorithms should be used by the UE for beam prediction inference and/or beam selection, that may provide the best and/or most efficient beam prediction inference performance or beam selection performance, taking into account feedback from other UEs.

For example, a dataset for training can be collected during regular UE operation. Particularly, for example, the gNB may transmit the reference signals by sweeping all the beams in the codebook (Set A) to search for the optimal or best beam ID. At the same time, the UE measures the beams and collects data (RSRP measurements of each beam) to train the ML model using the RSRP measurements as input and the optimal beam ID as output. Training of the ML model can be performed at UE or the remote server, e.g., the UE vendor's server. After training, the ML model may be used for beam prediction inference. The UE may, for example, measure only a subset of the transmitted beams from gNB (set B). The UE may use the RSRP measurements as input to the ML model and predicts the optimal beam ID (beam prediction inference). The ML model deployed to the UE reduces the measurement overhead of typical search methods because only a subset of beams is measured, for example.

Figure 4:
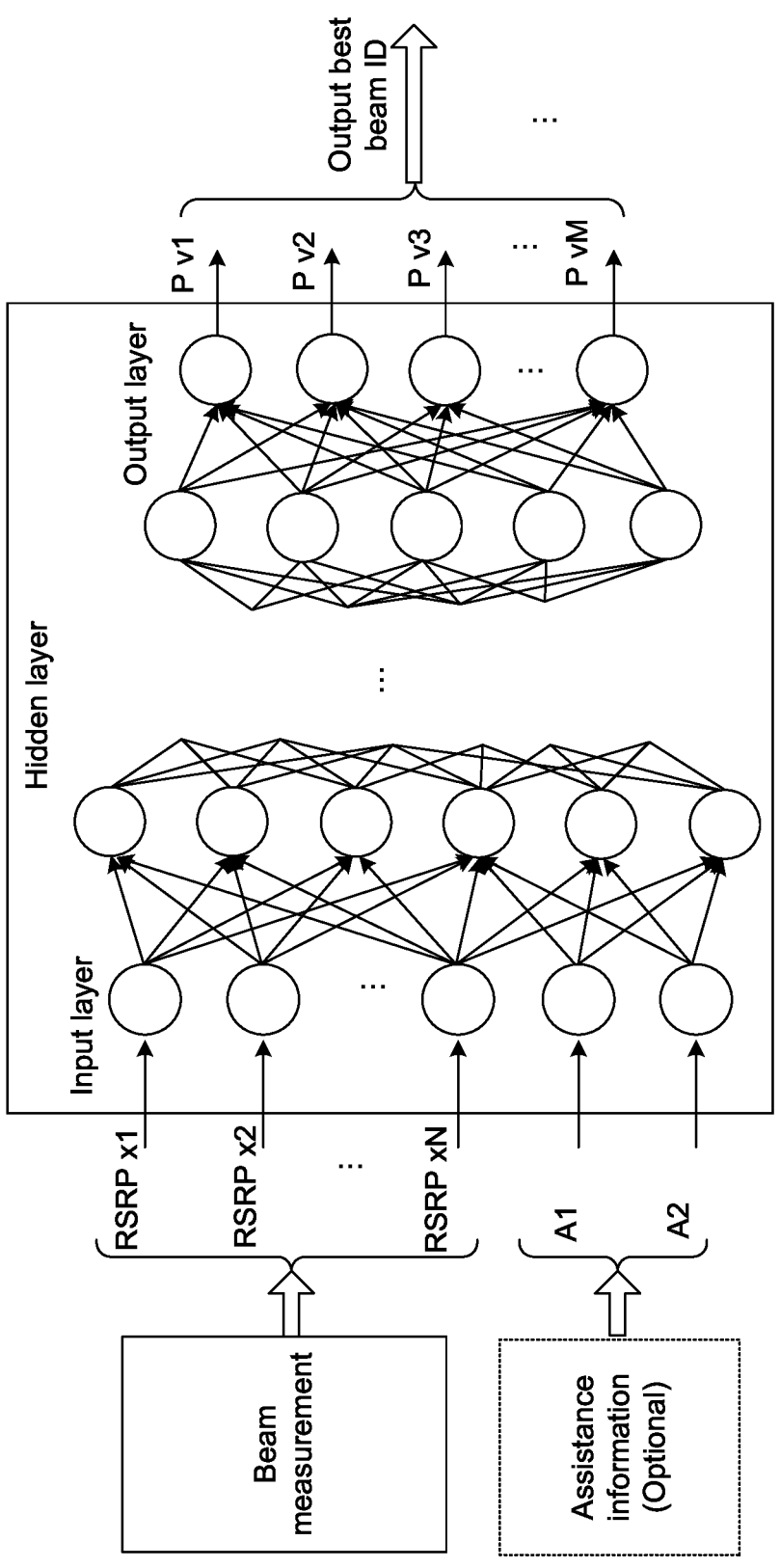
FIG. 4 is an example of a ML model that may be used to perform beam prediction inference.

It may be up to the UE to define the details of the ML model to train and deploy. FIG. 4 is an example of a ML model that may be used to perform beam prediction inference. The ML model of FIG. 4 may be, for example, a Multilayer perceptron (MLP) ML model including of three parts: the input layer, the hidden layers, and the output layer. The input layer takes as input the RSRP measurements of the set B of beams corresponding to CSI-RS (reference signal) resources {x1, x2, . . . , xN}. Assistance information may also be used for ML model input to improve performance. The input set passes through a series of fully connected hidden layers connected to the output layer. In the output, a SoftMax function is used to calculate the probability that each beam in set A is the best beam. Therefore, the predicted beam is selected to maximize the probability of each neuron in the output layer. The ML model thus, receives beam measurements as inputs, and outputs a beam ID or beam index of a best beam.

One aspect of the beam prediction task at the UE, is the selection of the subset of beams forming set B to be used as input for the ML model. Set B depends on the set of CSI-RS resources configured by the gNB. For overhead savings, gNB may use the same CSI-RS resources for all UEs in the sector. At the same time the UE may maintain a fixed pattern of beam measurements for ML input during training and inference phases. Variation of the pattern between the two phases may, at least in some cases, impair the performance of the ML model. Therefore, UE may train different ML models for different predefined patterns of beam measurements to improve the flexibility of operation for ML model inference and avoid the use of UE-specific CSI-RS.

FIG. 5 is a diagram illustrating a plurality of different ML model based algorithms for beam prediction inference and a non-ML based algorithm for beam selection. FIG. 5 lists four different ML models that the UE can use for the beam prediction task. As a backup solution, the UE can choose to use the traditional non-ML exhaustive 64 algorithm (e.g., requiring 64 reference signal measurements). The ML-32 beam model requires the UE to perform 32 reference signal measurements; the ML-16 beam model requires the UE to perform 16 reference signal measurements; and the ML-8 beams model requires the UE to perform 8 reference signal measurements. A beam pattern is shown for each of these algorithms or ML models, indicating the beams that should be measured by the UE and used as inputs for beam prediction inference (for the ML models) or beam selection (for the non-ML exhaustive 64 reference signal model). These reference signal measurements are input the selected ML model, and a predicted beam is output by the ML model as part of the beam prediction inference performed by the selected ML model. In an example ML scenario, the gNB, may configure 32 CSI-RS resources (32 beams are transmitted) for all UEs in the sector. However, the UE can choose to measure only 8 or 16 beams (or all 32 beams) taken from the 32 CSI-RS resources. In this way, the use of either of the ML models (32, 16 or 8 measurement models) saves energy not to measure the remaining resources (e.g., in this example, the ML-16 model and the ML-8 model conserve additional energy and time by only measuring 16 reference signals and 8 reference signals, respectively, of the 32 transmitted reference signals/beams). Alternately, the UE may measure all 32 beams. In any case, one of the ML models may be selected by the UE to strike a good balance between the ML accuracy performance and the number of beam measurements. Based on feedback (e.g., beam change dynamics event information) to the gNB from other UEs that have one or more corresponding conditions within a threshold to this UE, the gNB may assist the UE to choose the most appropriate ML model (e.g., by gNB sending a request to the UE to use a specific ML model based algorithm for beam prediction inference).

Figure 6:
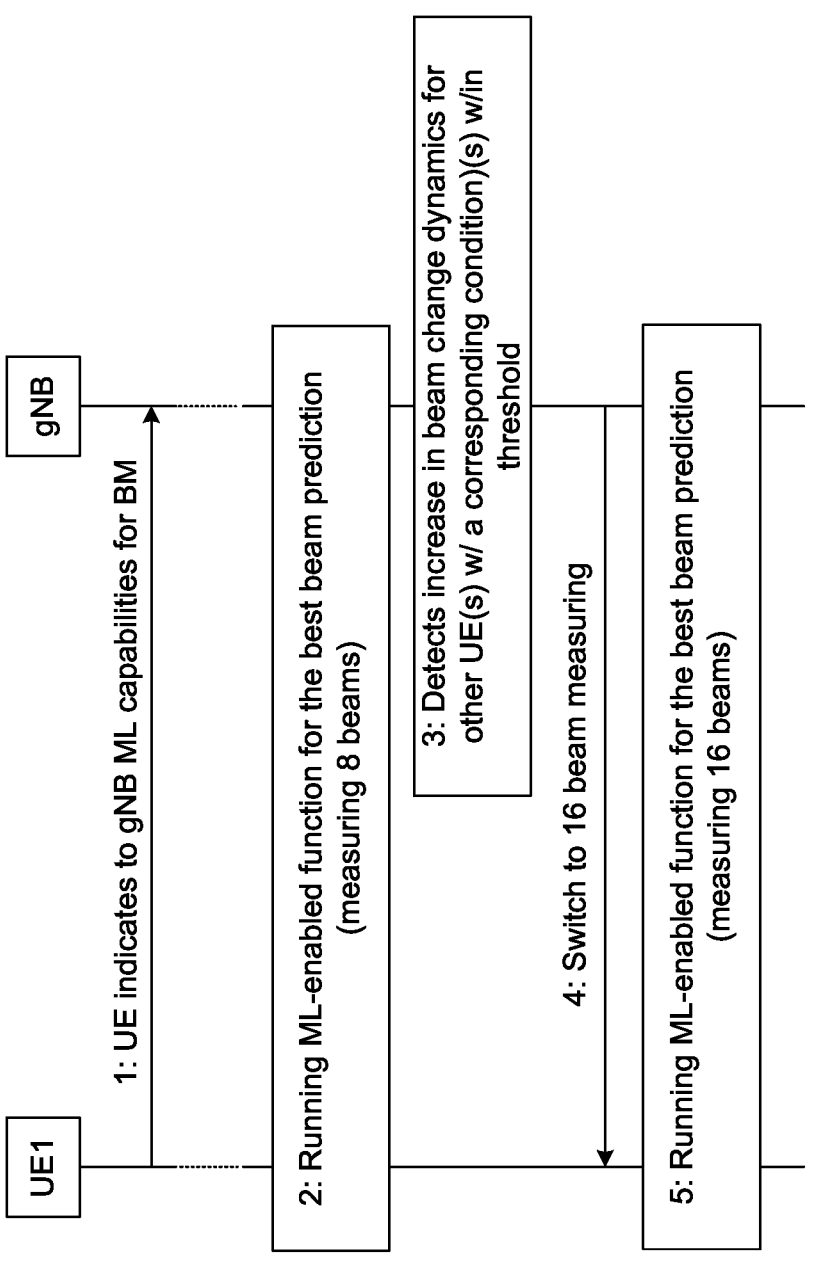
FIG. 6 is a diagram illustrating operation of a network in which the UE is requested to change to a greater or higher number beam measurement ML model for beam prediction inference based on an increase in beam change dynamics.

FIG. 6 is a diagram illustrating operation of a network in which the UE is requested to change to a greater or higher number beam measurement ML model for beam prediction inference based on an increase in beam change dynamics. A UE1 may be in communication with gNB. At step 1 of FIG. 6, UE1 may provide capabilities information to the gNB indicating, e.g., that it is capable of perform ML assisted beam selection, or can perform ML model based algorithm for beam prediction inference using 8, 16 and/or 32 reference signal measurement (e.g., based on any of these ML models), e.g., in addition to legacy non-ML based algorithm to perform beam selection. At step 2, the UE may be using the 8 measurement ML model for beam prediction inference, and the UE1 may notify the gNB that it is using the 8 measurement (or ML-8 beams model) ML model for beam prediction inference. At step 3, the gNB may obtain or receive beam change dynamics event information from one or more other UEs that have one or more corresponding conditions within a threshold to UE1, e.g., indicating an increase in beam change dynamics (e.g., where UEs with corresponding condition to UE1 may have reported beam failure, or that they switch to greater measurement number (e.g., they switch from 8 beam measurement ML model to 16 beam measurement ML model) ML model for beam prediction inference. Thus, based on this information that may indicate that other UEs with at least one corresponding condition within a threshold have experienced increased beam change dynamics, the gNB sends an instruction or request at step 4 that instructs the UE1 to change from 8 beam measurement ML model to 16 beam measurement ML model for beam prediction inference, so that a more accurate beam prediction inference will be performed. At step 5, the UE changes and now runs or uses the 16 beam measurement ML model for beam prediction inference.

Figure 7:
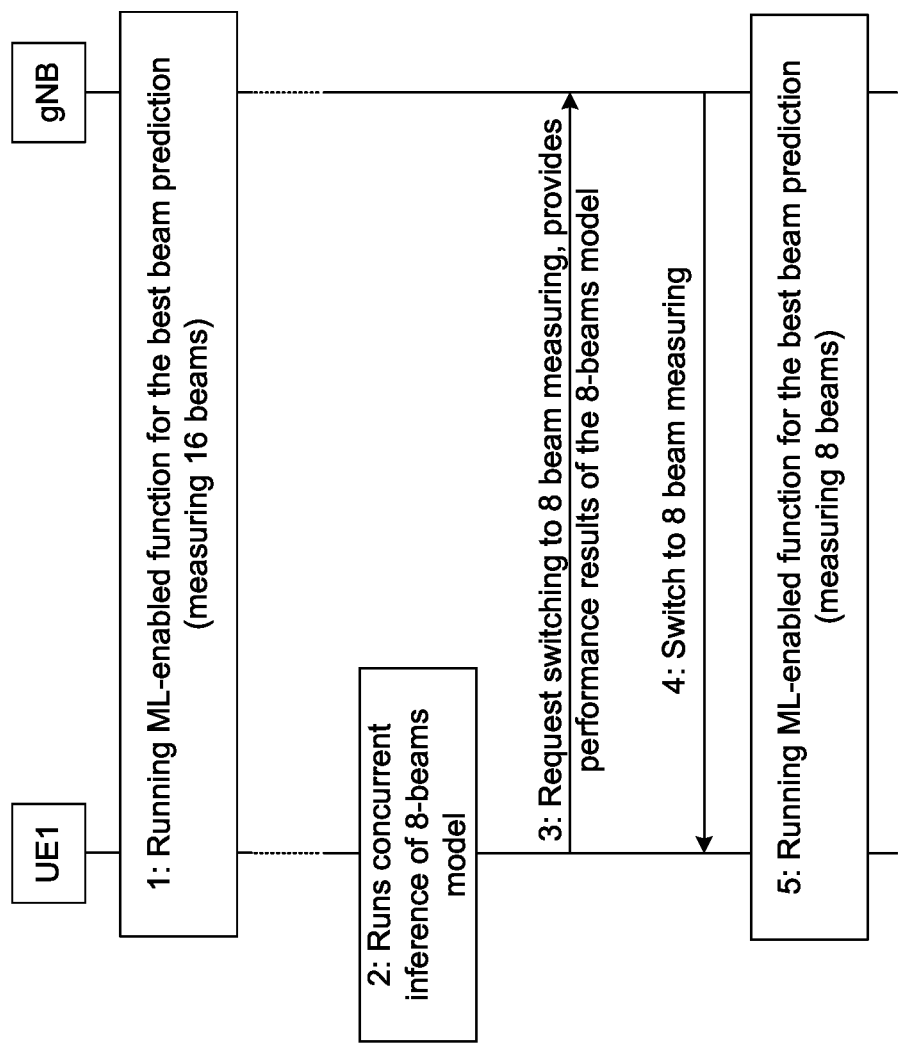
FIG. 7 is a diagram illustrating operation of a network in which the UE is requested to change to a lower number beam measurement ML model for beam prediction inference based on a decrease in beam change dynamics.

FIG. 7 is a diagram illustrating operation of a network in which the UE is requested to change to a lower number beam measurement ML model for beam prediction inference based on a decrease in beam change dynamics. As shown in FIG. 7, at step 1, the UE1 is running a 16 beam measurement ML model for beam prediction inference. At step 2, the UE1 may begin concurrently also running the 8 beam measurement ML model for beam prediction inference. And, at some point the UE may compare the beam prediction inference outputs for both of these 8 beam measurement and 16 beam measurement ML models, and may determine that the 8 beam measurement ML model has similar (e.g., within a threshold) performance (e.g., in terms of accurate or good beam prediction) to the 16 beam measurement ML model. Thus, because both of these ML models may have similar performance of beam prediction, the UE may want to change to the lower measurement number ML model, e.g., to reduce power consumption and use a more efficient ML model for beam prediction. Thus, at step 3, UE1 may send a message or request to gNB to request that UE switch from 16 beam measurement ML model to the lower measurement (8 beam measurement) ML model for beam prediction inference. At step 4, UE1 receives a request, instruction, confirmation or reply from gNB that instructs or requests the UE1 to change to 8 beam measurement ML model. At step 5, the UE1 may then change to the 8 beam measurement ML model for beam prediction inference.

Figures 8, 9:
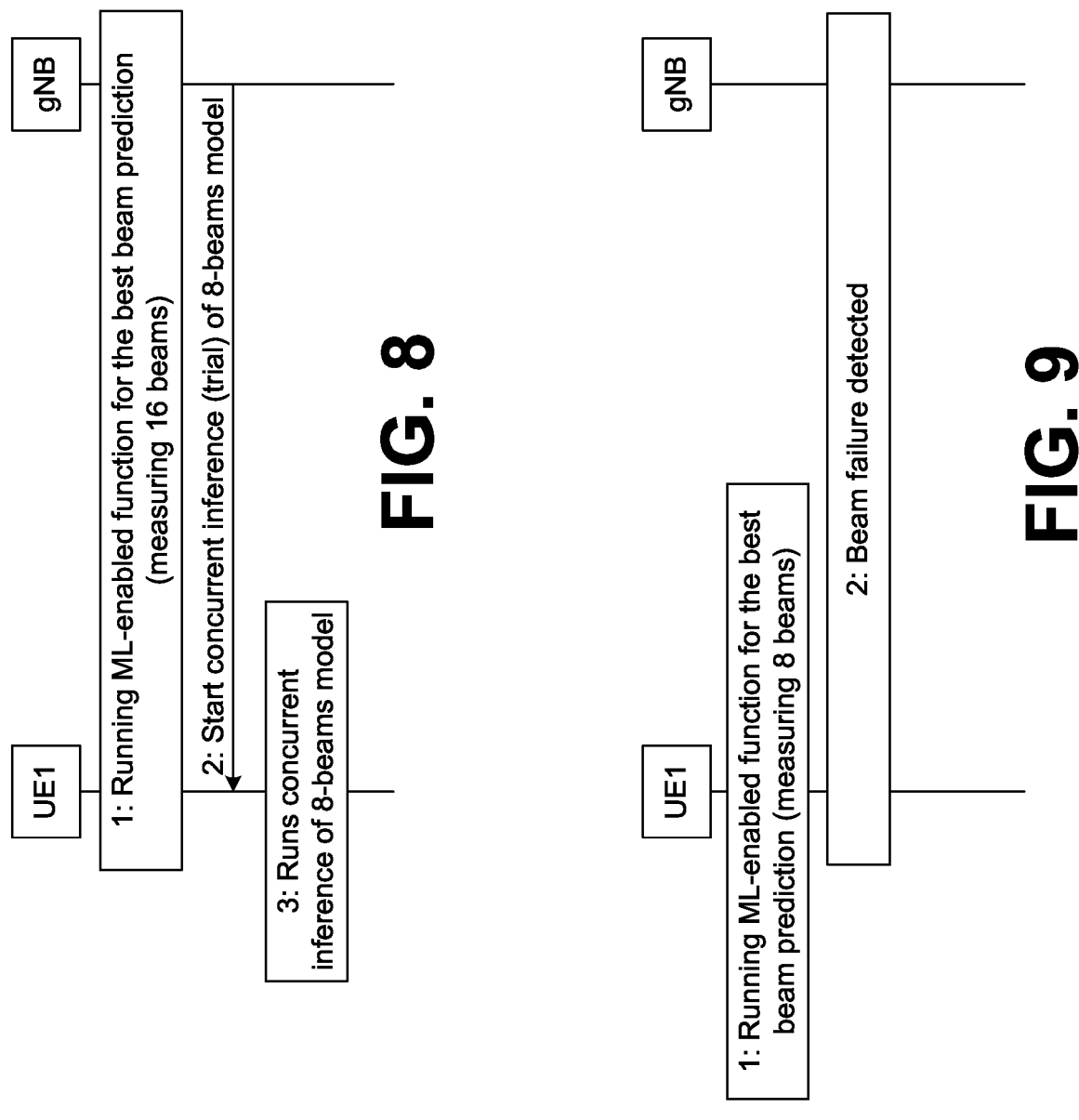
FIG. 8 is a diagram illustrating a UE performing beam prediction inference concurrently using two different ML models.
FIG. 9 is a diagram illustrating a UE reporting a beam failure to a network node as an example of reporting beam change dynamics event information.

FIG. 8 is a diagram illustrating a UE performing beam prediction inference concurrently using two different ML models. At step 1, the UE1 is performing beam prediction inference using the 16 beam measurement ML model. At step 2, gNB may detect (e.g., based on beam change dynamics event information received from the other UEs) that other UEs with one or more corresponding condition within a threshold to UE1 have switched or changed to the lower number beam measurement (e.g., to 8 beam measurement) ML model for beam prediction inference. Based on this (and that UE1 has 1 or more corresponding conditions within a threshold to these other UEs that changed to the 8 beam measurement ML model), the gNB (at step 2) sends a request or instruction that instructs UE1 to begin concurrent beam prediction inference also using 8 beam measurement ML model, e.g., so UE1 may be able to compare beam prediction performance of both 8 beam measurement and 16 beam measurement ML models, and choose most efficient model that still performs well. If the performance is similar, the UE1 may change to 8 beam measurement ML model for beam prediction inference, for example.

FIG. 9 is a diagram illustrating a UE reporting a beam failure to a network node as an example of reporting beam change dynamics event information. In step 1, the UE1 is running a 8 beam measurement ML model for beam prediction inference. In this example, a beam failure may be considered an example of or an indication of an increase in beam change dynamics, and this may cause the UE1 to change to a higher number of beam measurement ML model for beam prediction inference, and/or may cause gNB (based on this information) to request other UEs with 1 or more corresponding conditions, within a threshold to increase the ML model to a higher beam measurement ML model for beam prediction inference.

Figure 10:
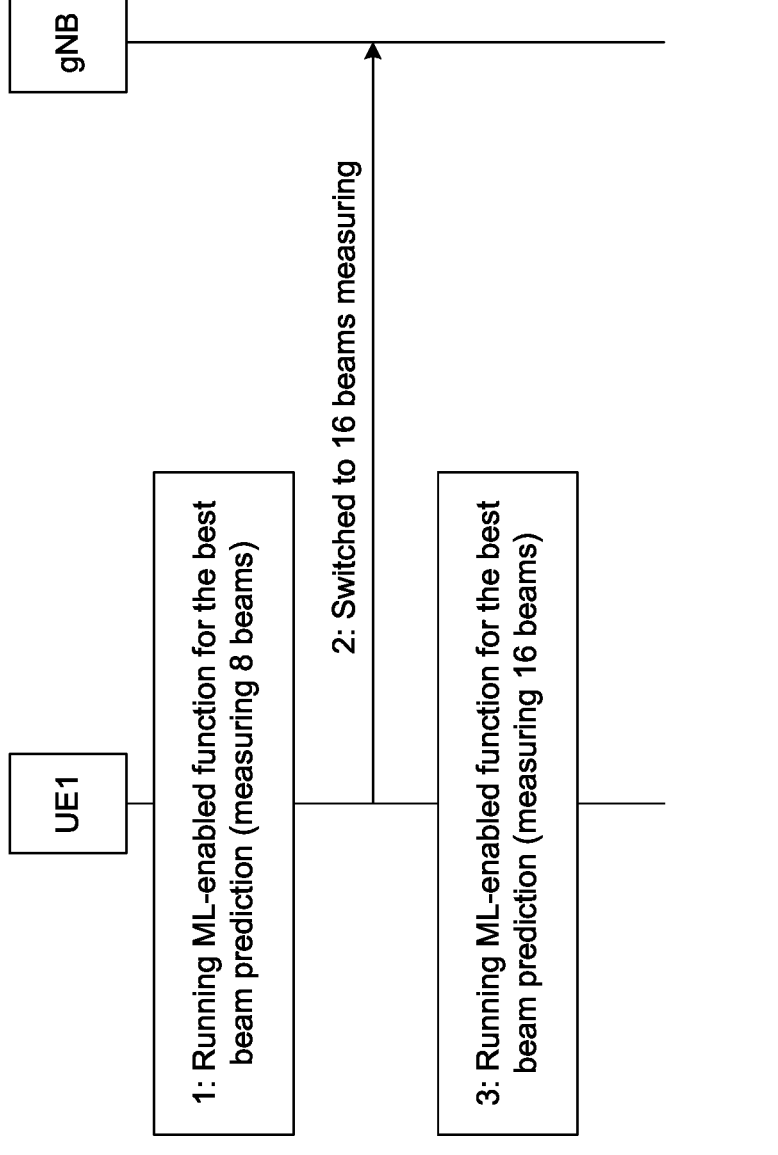
FIG. 10 is a diagram illustrating a UE that reports that it has changed or switched, e.g., from a 8 beam measurement ML model to a higher beam measurement model (e.g., a 16 beam measurement model) for beam prediction inference.

FIG. 10 is a diagram illustrating a UE that reports that it has changed or switched, e.g., from a 8 beam measurement ML model to a higher beam measurement model (e.g., a 16 beam measurement model) for beam prediction inference. At step 1, the UE1 is running a 8 beam ML model for beam prediction inference, and then decides to switch to a 16 beam ML model for beam prediction inference. At step 2, the UE1 sends a message to notify the gNB that it has switched to the 16 beam measurement ML model for beam prediction inference. At step 3, UE1 now runs the 16 beam measurement ML model for beam prediction inference.

Figure 11:
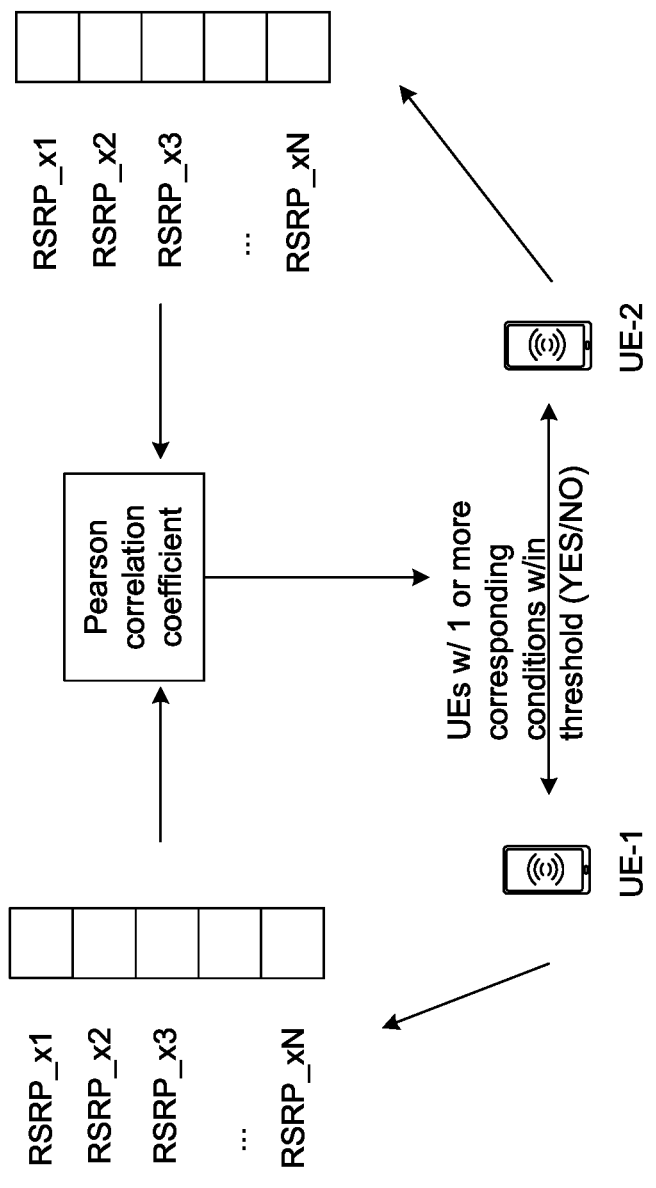
FIG. 11 is a diagram illustrating an example of a node (e.g., gNB) determining whether two UEs have a corresponding condition within a threshold.

FIG. 11 is a diagram illustrating an example of a node (e.g., gNB) determining whether two UEs have a corresponding condition within a threshold. The experience of one UE is relevant to another UE if they have similar capabilities. The UE capabilities are indicated to the gNB when a UE attaches to NW. Additionally, UE IMEI can be used to determine UEs of the same model, as an example of a corresponding condition. UEs close to each other (e.g., UEs having a location within a threshold distance of each other, e.g., within 10 m) other will likely have spatially correlated channels, meaning that they experience similar channel propagation characteristics like pathloss, shadowing, and multipath fading. The best beam for UEs in proximity is likely the same. Therefore, they may share the same ML model to predict the best beam. Because the gNB receives measurement reports from multiple or even all UEs in the network, gNB may identify the UEs that are spatially correlated (an example of corresponding conditions, within a threshold).

Referring to FIG. 11, this figure illustrates gNB determining if these UEs have one or more corresponding conditions within a threshold, e.g., by analyzing their (beam) measurement reports. In one example shown in FIG. 11, the gNB may proceed as follows: gNB receives beam measurement reports for different UEs; gNB analyzes the correlation between RSRP values measured (for different beams) at UEs, utilizing the Pearson correlation method that assigns a value between −1 and 1 for the Pearson correlation coefficient. A same or similar RSRP values (e.g., within a threshold) for beams among two UEs may indicate that these UEs have a corresponding condition related to spatial correlation or propagation conditions for the two UEs, for example. The higher the Pearson correlation coefficient the higher corresponding condition between UEs, for example. It is up to the implementation to select the specific threshold values for the similarity coefficient (Pearson correlation coefficient) to conclude that two UEs are in (or have a) corresponding conditions, if using the Pearson correlation coefficient to make this determination. gNB maintains similarity coefficients for the served UEs over time, which allows to filter out false similarities, e.g., caused by random NLoS propagation. To filter out false similarities, gNB may apply well-known filtering methods, such as exponential smoothing. For example, two UEs may be considered to be in corresponding conditions within a threshold if their similarity coefficient stays higher than α over time Δt (parameters α, Δt are up to configuration, in one working example, those could be α>0.5 and Δt=1 second). gNB maintains information about UEs in similar conditions during the operation. For example, if RSRP beam measurements of two UEs are correlated, the UEs are spatially close, and their channels are affected by similar propagation conditions. Hence, in this situation, beam change dynamics may be the same or very similar for both of these UEs. Thus, beam change dynamics at one of the UEs associated with a beam change or change in ML model for beam predication inference may be used to control changes in ML models used for beam prediction at the other UE.

In one working example, it may be sufficient (e.g., to trigger an action by gNB for other UEs with corresponding conditions) that at least one UE in corresponding condition(s) reports a beam failure or switches to a ML model with more measurements or switches to a non-ML algorithm, to cause the gNB to request other UEs with corresponding condition to make a similar change in ML model.

The network or gNB may monitor KPIs or performance indicators, to determine if performance of a ML model is within a threshold of performance of another ML model, such as: KPIs monitored by the user device may include: Beam prediction accuracy related KPIs including beam prediction accuracy defined as the percentage of predictions that the predicted beam is the genie-aided beam. Or the RSRP difference between the RSRP of the predicted beam (or the predicted RSRP) and the ideal RSRP, or system performance related KPIs, including UE throughput, control signal overhead, power consumption may be monitored.

Figure 12:
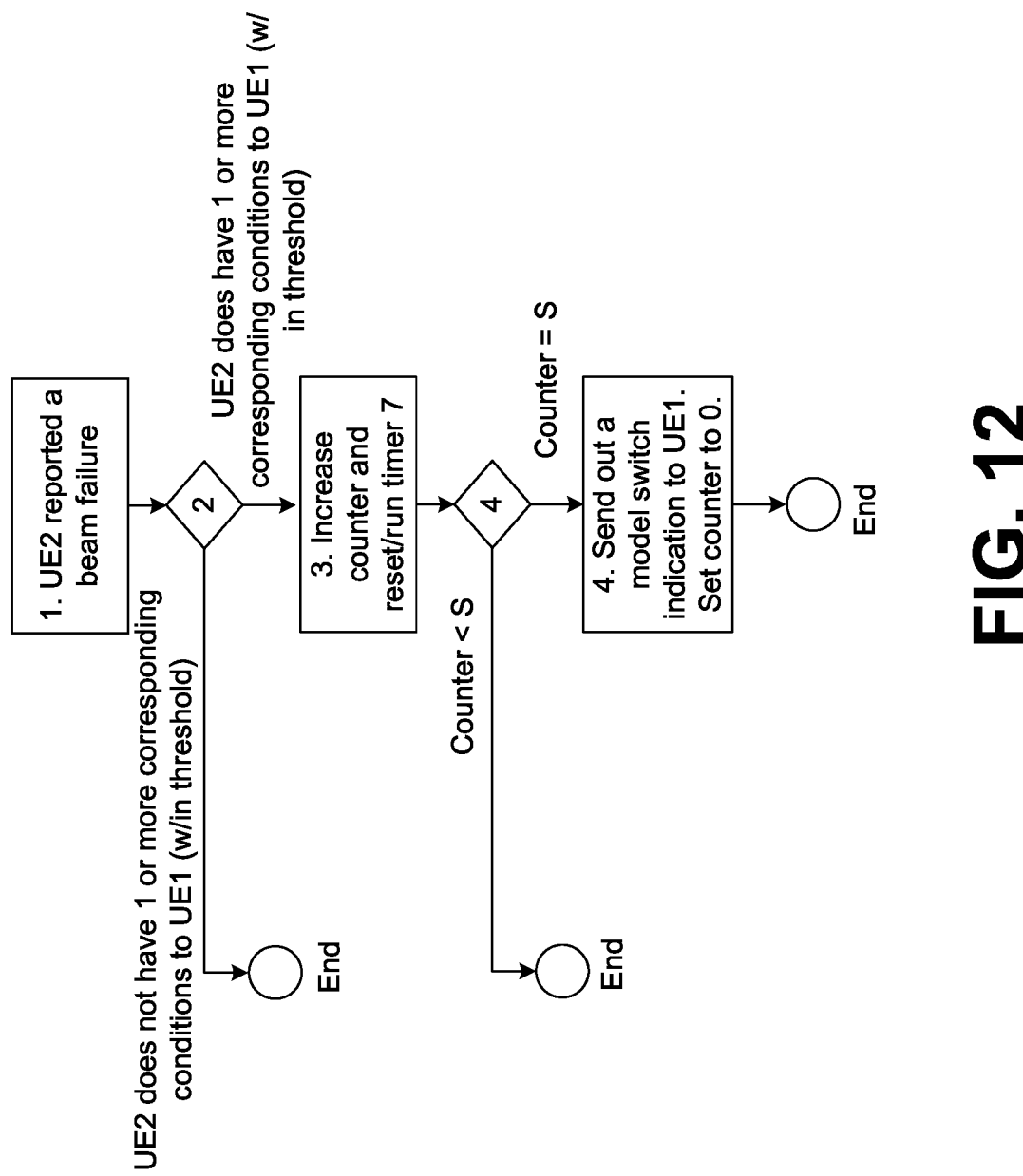
FIG. 12 is a diagram illustrating example processing steps that may be used to determine when to send out a model switch command.

In another scenario, gNB may be configured in a way that more than one UE in a similar condition should report beam failure or model switch before gNB will send out a model switch command to other UEs in similar conditions. The example of processing steps for this case is shown in FIG. 12. FIG. 12 is a diagram illustrating example processing steps that may be used to determine when to send out a model switch command. In such a case, gNB needs to maintain an incremental counter associated with each UE. The default value of the counter is 0. The counter increases every time UE in similar conditions reported beam failure or switched to a model with more measurements/non-ML algorithm. When the value of a counter becomes >1, it triggers a timer. When the timer expires, it reduces the counter's value by 1 and starts running again while the counter value >0. If the counter value increases while the timer is running, it resets the timer. When the counter reaches the value S, gNB sends a model switch indication to UEs in a similar condition. The duration of the timer T and the counter threshold S that triggers model switch in other UEs are implementation-specific parameters configured by network implementation.

Signaling may be provided to indicate a specific ML model or algorithm of the UE. Thus, for example, the UE may transmit to the network node, information indicating a mapping (e.g., a bit map) between values of at least one field of a message and a plurality of algorithms that may be used by the first user device to perform beam prediction inference or beam selection. Thus, the UE may provide a bit map that may indicate specific ML models or a non-ML algorithm for beam prediction or beam selection. A UE may indicate algorithms to be used by the UE for the beam prediction tasks when attaching to network, as a part of UE capability information over RRC interface. This indication may, for example, include details of the algorithms and their IDs. For the example shown the Table 1 below, there are four different algorithms including three ML based algorithms for beam prediction inference, a non-ML based algorithm for beam prediction or selection. gNB may maintain the information about algorithms and their bitmap values that can be used by UEs for the best beam prediction. When instructing or requesting the UE to switch to a specific ML model or algorithm for beam prediction inference or beam selection, the gNB may indicate an ID or bitmap value of an algorithm to which UE should switch. This indication can be included to RRCReconfiguration message specified in 3GPP TS 38.331. Alternatively, the gNB can use the DL MAC-CE (MAC control element) to indicate UE to switch between different ML models and the non-ML operation.

TABLE 1

| R | | | Serving Cell ID | | | BWP ID | OCTET-1 |
|---|---|---|---|---|---|---|---|
| R | R | R | Trial | ML ALG3 | ML ALG2 | ML ALG1 | NON-ML | OCTET-2 |

Table 1 shows fields, e.g., bits of a bit map, which may be provided within a message or control information (e.g., which may be transmitted from UE to gNB to indicate specific bitmap values and/or IDs of algorithms supported by UE) that may be set to 0 or 1 for each of: ML Algorithm 3 (ML ALG3), ML algorithm 2 (ML ALG2), ML algorithm 1 (ML ALG1), and a non-ML model algorithm for beam selection (non-ML), for example. The gNB may use these bitmap values to indicate a specific algorithm the UE should switch to, for example.

| | |
|---|---|
| Serving Cell ID | This field indicates the identity of the Serving Cell for which the MAC CE applies. The length of the field is 5 bits; |
| BWP ID | This field indicates a DL BWP for which the MAC CE applies as the codepoint of the DCI bandwidth part indicator field as specified in TS 38.212 [9]. The length of the BWP ID Bandwidth part ID - field is 2 bits |
| ML ALG1 | Machine Learning Algorithm1 if bit value 1 |
| ML ALG2 | Machine Learning Algorithm2 if bit value 1 |
| ML ALG3 | Machine Learning Algorithm3 if bit value 1 |
| NON-ML | Legacy beam measurement/selection if bit value 1 |
| Trial | Indicates if the concurrent inference of models is needed |
| R | Reserved |
| | UE might list the ML algorithms in order to gNB, to inform gNB which fields correspond to which models. |

The provided example assumes that UE has been configured with three different ML models and legacy non-ML operations. Based on the HARQ Feedback of MAC-CE, the gNB confirms UE's model switching. Compared RRC, the MAC-CE is faster, and configuration is applied quickly without any signalling overhead.

MAC-CE fields related to each ML models (OCTET-2) are limited to one bit, therefore mapping between the algorithms used by UE and their representation in MAC-CE should be agreed between UE and gNB. It can be done by UE (preferably) in the capability information message sent over RRC to gNB, or by gNB in RRCReconfiguration message.

Some further examples will be provided.

Example 1. A method comprising: performing (210, FIG. 2), by a first user device (e.g., UE1), beam prediction inference using a first machine learning model based algorithm (e.g., ML ALG1 in Table 1, which may be an 8 beam measurement ML model for beam prediction inference) that uses a first quantity of reference signal measurements (e.g., which uses 8 beam/reference signal measurements); controlling transmitting (220, FIG. 2), by the first user device (UE1) to a network node (gNB), an indication (e.g., such as at step 1, FIG. 7, or other step) that the first user device (UE1) is using the first machine learning model based algorithm that uses the first quantity of reference signal measurements; and controlling receiving (230, FIG. 2), by the first user device (UE1) from the network node (gNB) based on beam change dynamics event information received by the network node (gNB) from one or more other user devices that have one or more corresponding conditions within a threshold to the first user device, a request for the first user device to either: 1) change to at least one of a non-machine learning model based algorithm (non-ML I table 1) to perform beam selection or a second machine learning model (ML ALG2 in Table 1, corresponding to 16 beam/reference signal measurement ML model for beam prediction inference) based algorithm that uses a second quantity (e.g., 16) of reference signal measurements to perform beam prediction inference, wherein the second quantity is different than the first quantity (see FIG. for example control messages to cause UE to change to 16 beam/reference signal measurement ML model), or 2) concurrently (run both at the same time) perform beam prediction inference using the first machine learning model based algorithm (e.g., ML ALG1, which uses 8 beam/reference signal ML model) and perform beam prediction inference using the second machine learning model based algorithm (e.g., ML ALG2, which uses 16 beam/reference signal measurement ML model, see operations of, e.g., FIG. 8 which shows UE receiving an instruction to perform concurrent beam prediction inference using 8 and 16 measurement ML models).

Example 2: The method of example 1, further comprising: detecting, by the first user device (UE1), beam change dynamics event information associated with a change in a beam selection for the first user device; controlling transmitting, by the first user device to the network node, the beam change dynamics event information associated with a change in a beam selection for the first user device. For example, UE1 may report to gNB that it detected a beam failure (see step 2, FIG. 9), or that the UE1 has switched to a different (e.g., 16 beam/reference signal measurement ML model, see step 2, FIG. 10).

Example 3. The method of any of examples 1-2, wherein the beam change dynamics event information comprises at least one of: information indicating that a rate of change or frequency of change of a best beam for the first user device is either increasing or becoming more dynamic, or is decreasing or becoming less dynamic; information indicating that a beam pattern for the first user device has changed; or information indicating one or more propagation environment changes associated with a change in beam selection for the first user device.

Example 4. The method of any of examples 1-3, wherein the beam change dynamics event information comprises, or further comprises, information indicating at least one of the following: a beam failure has been detected by the user device (e.g., see step 2, FIG. 9, where UE1 detects beam failure, which may be reported to gNB); a change performed by the first user device from the first machine learning model based algorithm that uses a first quantity of reference signal measurements to perform beam prediction inference to a different machine learning model based algorithm that uses a quantity of reference signal measurements that is different than the first quantity of reference signal measurements (e.g., see where UE1 reports to gNB at step 2 of FIG. 10, that it has switched to a 16 beam/reference signal measurement ML model for beam prediction inference); a change performed by the first user device from the first machine learning model based algorithm that uses a first quantity of reference signal measurements to perform beam prediction inference to the non-machine learning model based algorithm to perform beam selection (e.g., UE1 may report that it has changed to a non-ML algorithm for beam selection); a request transmitted by the first user device to the network node for the first user device to change from the first machine learning model based algorithm that uses a first quantity of reference signal measurements to perform beam prediction inference to either the non-machine learning model based algorithm to perform beam selection or to a different machine learning model based algorithm to perform beam prediction that uses a quantity of reference signal measurements that is different than the first quantity of reference signal measurements (e.g., see step 3 of FIG. 7, where UE1 sends a request to gNB requesting to switch from a 16 beam/reference signal ML model to a 8 beam/reference signal measurement model for beam prediction inference); that a performance of beam prediction inference of the first user device based on the first machine learning model based algorithm that uses the first quantity of reference signal measurements is less than a first threshold level of performance; that the performance of the first machine learning model based algorithm to perform beam prediction inference by the first user device is within a second threshold level of performance to a performance of either the non-machine learning model based algorithm or the different machine learning model based algorithm to perform beam prediction inference.

Example 5. The method of any of examples 1-4, wherein the controlling receiving may include: controlling receiving, by the first user device from the network node based on beam change dynamics event information received by the network node from one or more other user devices that have one or more corresponding conditions within a threshold to the first user device, the request for the first user device to change to the second machine learning model based algorithm that uses the second quantity of reference signal measurements to perform beam prediction inference.

Example 6. The method of example 5, further comprising: changing, by the first user device based on the received request, to the second machine learning model based algorithm that uses the second quantity of reference signal measurements to perform beam prediction inference (e.g., see step 5 where UE1 changes from a 16 beam/reference signal measurement ML model to an 8 beam/reference signal measurement ML model, based on a request at step 4 from the gNB).

Example 7. The method of any of examples 1-6, wherein the controlling receiving comprises: controlling receiving, by the first user device from the network node based on beam change rate event information received by the network node from one or more other user devices that have one or more similar conditions to the first user device, the request for the first user device to concurrently perform beam prediction inference using the first machine learning model based algorithm and perform beam prediction inference using the second machine learning model based algorithm (e.g., UE1 in FIG. 8 may run concurrently both 8 and 16 beam/reference signal measurement ML models for beam prediction at step 3, based on request at step 2 from gNB).

Example 8. The method of example 7, and further comprising: concurrently performing (e.g., see step 3 of FIG. 8 where UE1 concurrently runs both 8 and 16 beam measurement ML models), by the user device based on the request, beam prediction inference based on the first machine learning model based algorithm and performing beam prediction inference using the second machine learning model based algorithm.

Example 9. The method of any of examples 1-8, further comprising: controlling transmitting, by the first user device (UE1) to the network node (gNB), information indicating a mapping between values of at least one field of a message and a plurality of algorithms that may be used by the first user device to perform beam prediction inference or beam selection (e.g., see Table 1, which may be transmitted by UE1 to gNB).

Example 10. The method of example 9, wherein: a first value of the field maps to the first machine learning model based algorithm that uses the first quantity of reference signal measurements (one of the bits of the bit map in Table 1 corresponds to ML ALG1); a second value of the field maps to the second machine learning model based algorithm that uses the second quantity of reference signal measurements (e.g., another of the bits of the bit map in Table 1 corresponds to ML ALG2); and a third value of the field maps to the non-machine learning model based algorithm to perform beam selection (e.g., another of the bits of the bit map in Table 1 corresponds to ML ALG3).

Example 11. The method of any of examples 1-10, wherein the one or more corresponding conditions within a threshold for the first user device and one or more other user devices comprise one or more of: the first user device is of a same device model or is manufactured by a same device vendor as the one or more other user devices; the first user device has a location that is within a threshold distance to a location of the one or more other user devices; there is a spatial correlation of a channel, within a threshold, for the first user device and the one or more other user devices (e.g., see FIG. 11, calculation of Pearson correlation coefficient); there is a correlation, within a threshold, of reference signal measurements of the first user device and reference signal measurements of the one or more other user devices (e.g., see FIG. 11, calculation of Pearson correlation coefficient); the first user device and the one or more other user devices exhibit a same channel propagation characteristics, within a threshold, including one or more of the following for received reference signals: received power, phase shift.

Example 12. The method of any of examples 1-11: wherein the controlling receiving the request comprises controlling receiving the request to change from the first machine learning model based algorithm that uses the first quantity of reference signal measurements to the second machine learning mode based algorithm that uses the second quantity of reference signal measurements that is greater than the first quantity, based on the network node receiving beam change dynamics event information from one or more other user devices that indicates that the rate of change or frequency of change of a best beam for the one or more other user devices is increasing or becoming more dynamic, wherein the one or more other user devices have one or more corresponding conditions within a threshold to the first user device.

Example 13. The method of any of examples 1-11: wherein the controlling receiving the request comprises controlling receiving the request to change from the first machine learning model based algorithm that uses the first quantity of reference signal measurements to the second machine learning mode based algorithm that uses the second quantity of reference signal measurements that is less than the first quantity, based on the network node receiving beam change dynamics event information from one or more other user devices that indicates that the rate of change or frequency of change of a best beam for the one or more other user devices is decreasing or becoming less dynamic, wherein the one or more other user devices have one or more corresponding conditions within a threshold to the first user device.

Example 14. An apparatus (e.g., 1300, FIG. 13) comprising: at least one processor (e.g., processor 1304, FIG. 13); and at least one memory (e.g., 1306, FIG. 13) including computer program code; the at least one memory and the computer program code configured to, with the at least one processor, cause the apparatus at least to: perform (210, FIG. 2), by a first user device, beam prediction inference using a first machine learning model based algorithm that uses a first quantity of reference signal measurements; control transmitting (220, FIG. 2), by the first user device to a network node, an indication that the first user device is using the first machine learning model based algorithm that uses the first quantity of reference signal measurements; and control receiving (230, FIG. 2), by the first user device from the network node based on beam change dynamics event information received by the network node from one or more other user devices that have one or more corresponding conditions within a threshold to the first user device, a request for the first user device to either: 1) change to at least one of a non-machine learning model based algorithm to perform beam selection or a second machine learning model based algorithm that uses a second quantity of reference signal measurements to perform beam prediction inference, wherein the second quantity is different than the first quantity, or 2) concurrently perform beam prediction inference using the first machine learning model based algorithm and perform beam prediction inference using the second machine learning model based algorithm.

Example 15. A non-transitory computer-readable storage medium comprising instructions stored thereon that, when executed by at least one processor, are configured to cause a computing system to perform the method of any of examples 1-13.

Example 16. An apparatus comprising means for performing the method of any of examples 1-13.

Example 17. An apparatus comprising: at least one processor; and at least one memory including computer program code; the at least one memory and the computer program code configured to, with the at least one processor, cause the apparatus at least to perform the method of any of examples 1-13.

Example 18. A method comprising: determining (310 FIG. 3), by a network node (gNB), that a group of user devices have one or more corresponding conditions within a threshold, wherein one or more of the user devices of the group are enabled to perform beam prediction inference using one or more machine learning model based algorithms with different quantities of reference signal measurements and are enabled to perform beam selection using a non-machine learning model algorithm; controlling receiving (320, FIG. 3), by the network node from a first user device of the group of user devices, beam change dynamics event information associated with a change in a beam change dynamics or a change in a beam selection for the first user device; and, controlling transmitting (330, FIG. 3), by the network node to a second user device of the group of user devices based on the received beam change dynamics event information, a request for the second user device to change to either: 1) a non-machine learning model based algorithm to perform beam selection, or 2) a different machine learning model based algorithm that uses a different quantity of reference signal measurements than currently used by the second user device to perform beam prediction inference.

Example 19. The method of example 18, wherein the beam change dynamics event information comprises at least one of: information indicating that a rate of change or frequency of change of a best beam for the first user device is either increasing or becoming more dynamic, or is decreasing or becoming less dynamic; information indicating that a beam pattern for the first user device has changed; or information indicating one or more propagation environment changes associated with a change in beam selection for the first user device.

Example 20. The method of any of examples 18-19, wherein the beam change dynamics event information comprises, or further comprises, information indicating at least one of the following: a beam failure has been detected by the user device; a change performed by the first user device from the first machine learning model based algorithm that uses a first quantity of reference signal measurements to perform beam prediction inference to a different machine learning model based algorithm that uses a quantity of reference signal measurements that is different than the first quantity of reference signal measurements; a change performed by the first user device from the first machine learning model based algorithm that uses a first quantity of reference signal measurements to perform beam prediction inference to the non-machine learning model based algorithm to perform beam selection; a request transmitted by the first user device to the network node for the first user device to change from the first machine learning model based algorithm that uses a first quantity of reference signal measurements to perform beam prediction inference to either the non-machine learning model based algorithm to perform beam selection or to a different machine learning model based algorithm to perform beam prediction that uses a quantity of reference signal measurements that is different than the first quantity of reference signal measurements; that a performance of beam prediction inference of the first user device based on the first machine learning model based algorithm that uses the first quantity of reference signal measurements is less than a first threshold level of performance; that the performance of the first machine learning model based algorithm to perform beam prediction inference by the first user device is within a second threshold level of performance to a performance of either the non-machine learning model based algorithm or the different machine learning model based algorithm to perform beam prediction inference.

Example 21. The method of any of examples 18-20, further comprising: controlling receiving, by the network node from one or more of the user devices of the group, information indicating a mapping between values of at least one field of a message and a plurality of algorithms that may be used by the one or more user devices of the group to perform beam prediction inference or beam selection.

Example 22. The method of example 21, wherein: a first value of the field maps to a first machine learning model based algorithm that uses a first quantity of reference signal measurements; a second value of the field maps to a second machine learning model based algorithm that uses a second quantity of reference signal measurements that is different than the first quantity; and a third value of the field maps to the non-machine learning model based algorithm to perform beam selection.

Example 23. The method of any of examples 18-22, wherein the one or more corresponding conditions within a threshold for the group of user devices comprise one or more of: user devices of the group have a same device model or have a device that is manufactured by a same device vendor or manufacturer; user devices of the group have a location that is within a threshold distance to a location of one or more other user devices of the group; there is a spatial correlation, within a threshold, of a channel for user devices of the group; there is a correlation, within a threshold, of reference signal measurements of user devices of the group; the user devices of the group exhibit a same channel propagation characteristics, within a threshold, including one or more of the following for received reference signals: received power, phase shift.

Example 24. An apparatus comprising: at least one processor; and at least one memory including computer program code; the at least one memory and the computer program code configured to, with the at least one processor, cause the apparatus at least to: determine, by a network node, that a group of user devices have one or more corresponding conditions within a threshold, wherein one or more of the user devices of the group are enabled to perform beam prediction inference using one or more machine learning model based algorithms with different quantities of reference signal measurements and are enabled to perform beam selection using a non-machine learning model algorithm; control receiving, by the network node from a first user device of the group of user devices, beam change dynamics event information associated with a change in a beam change dynamics or a change in a beam selection for the first user device; and control transmitting, by the network node to a second user device of the group of user devices based on the received beam change dynamics event information, a request for the second user device to change to either: 1) a non-machine learning model based algorithm to perform beam selection, or 2) a different machine learning model based algorithm that uses a different quantity of reference signal measurements than currently used by the second user device to perform beam prediction inference.

Example 25. A non-transitory computer-readable storage medium comprising instructions stored thereon that, when executed by at least one processor, are configured to cause a computing system to perform the method of any of examples 18-23.

Example 26. An apparatus comprising means for performing the method of any of examples 18-23.

Example 27. An apparatus comprising: at least one processor; and at least one memory including computer program code; the at least one memory and the computer program code configured to, with the at least one processor, cause the apparatus at least to perform the method of any of examples 18-23.

Figure 13:
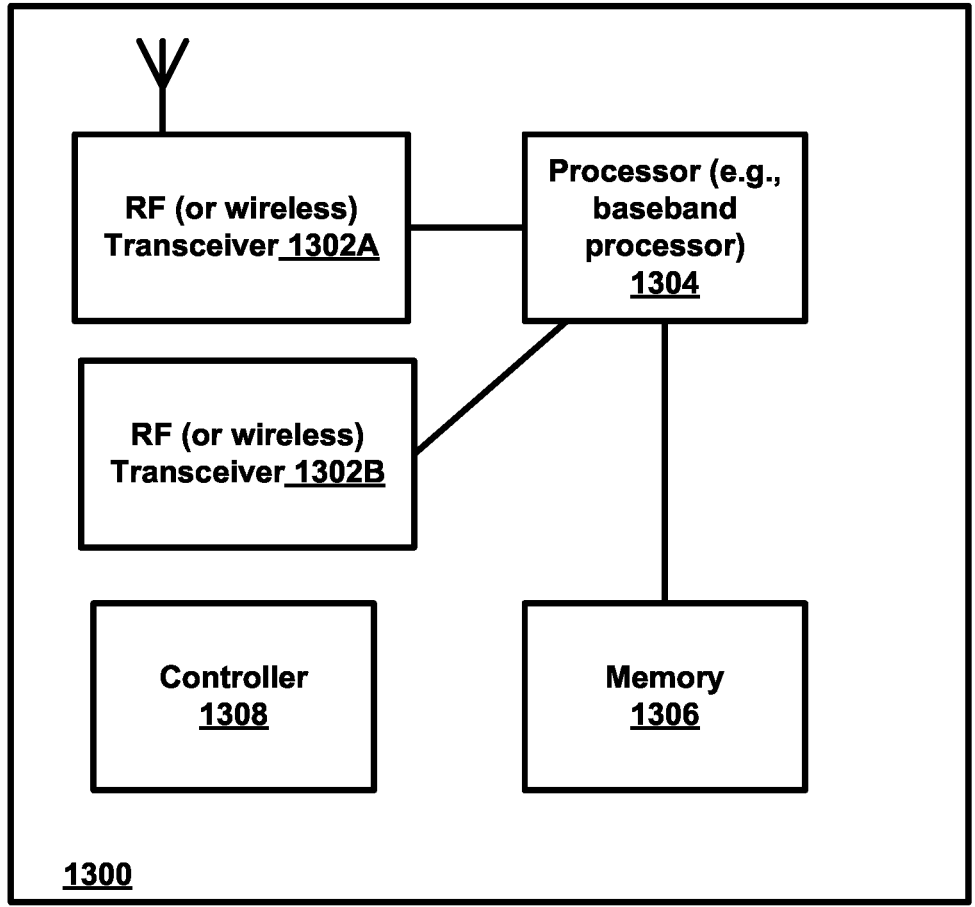
FIG. 13 is a block diagram of a wireless station or node (e.g., network node, user node or UE, relay node, or other node).

FIG. 13 is a block diagram of a wireless station or node (e.g., UE, user device, AP, BS, eNB, gNB, RAN node, network node, TRP, or other node) 1300 according to an example embodiment. The wireless station 1300 may include, for example, one or more (e.g., two as shown in FIG. 13) RF (radio frequency) or wireless transceivers 1302A, 1302B, where each wireless transceiver includes a transmitter to transmit signals and a receiver to receive signals. The wireless station also includes a processor or control unit/entity (controller) 1304 to execute instructions or software and control transmission and receptions of signals, and a memory 1306 to store data and/or instructions.

Processor 1304 may also make decisions or determinations, generate frames, packets or messages for transmission, decode received frames or messages for further processing, and other tasks or functions described herein. Processor 1304, which may be a baseband processor, for example, may generate messages, packets, frames or other signals for transmission via wireless transceiver 1302 (1302A or 1302B). Processor 1304 may control transmission of signals or messages over a wireless network, and may control the reception of signals or messages, etc., via a wireless network (e.g., after being down-converted by wireless transceiver 1302, for example). Processor 1304 may be programmable and capable of executing software or other instructions stored in memory or on other computer media to perform the various tasks and functions described above, such as one or more of the tasks or methods described above. Processor 1304 may be (or may include), for example, hardware, programmable logic, a programmable processor that executes software or firmware, and/or any combination of these. Using other terminology, processor 1304 and transceiver 1302 together may be considered as a wireless transmitter/receiver system, for example.

In addition, referring to FIG. 13, a controller (or processor) 1308 may execute software and instructions, and may provide overall control for the station 1300, and may provide control for other systems not shown in FIG. 13, such as controlling input/output devices (e.g., display, keypad), and/or may execute software for one or more applications that may be provided on wireless station 1300, such as, for example, an email program, audio/video applications, a word processor, a Voice over IP application, or other application or software.

In addition, a storage medium may be provided that includes stored instructions, which when executed by a controller or processor may result in the processor 1304, or other controller or processor, performing one or more of the functions or tasks described above.

According to another example embodiment, RF or wireless transceiver(s) 1302A/1302B may receive signals or data and/or transmit or send signals or data. Processor 1304 (and possibly transceivers 1302A/1302B) may control the RF or wireless transceiver 1302A or 1302B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semi-conductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising: at least one processor and at least one memory including computer program code, the at least one memory and the computer program code configured to, with the at least one processor, cause the apparatus at least to:

perform, by a first user device, beam prediction inference using a first machine learning model based algorithm that uses a first quantity of reference signal measurements;

control transmitting, by the first user device to a network node, an indication that the first user device is using the first machine learning model based algorithm that uses the first quantity of reference signal measurements;

control receiving, by the first user device from the network node based on beam change dynamics event information received by the network node from one or more other user devices that have one or more corresponding conditions within a threshold to the first user device, a request for the first user device to change to at least one of a non-machine learning model based algorithm to perform beam selection or a second machine learning model based algorithm that uses a second quantity of reference signal measurements to perform beam prediction inference, wherein the second quantity is different than the first quantity, wherein the beam change dynamics event information comprises:

information indicating that a rate of change or frequency of change of a best beam for the first user device is either increasing or becoming more dynamic, or is decreasing or becoming less dynamic, information indicating that a beam pattern for the first user device has changed, information indicating one or more propagation environment changes associated with a change in beam selection for the first user device, information indicating a request transmitted by the first user device to the network node for the first user device to change from the first machine learning model based algorithm that uses the first quantity of reference signal measurements to perform beam prediction inference to either the non-machine learning model based algorithm to perform beam selection or to a different machine learning model based algorithm to perform beam prediction that uses a quantity of reference signal measurements that is different than the first quantity of reference signal measurements;

information indicating that a performance of beam prediction inference of the first user device based on the first machine learning model based algorithm that uses the first quantity of reference signal measurements is less than a first threshold level of performance; and information indicating that the performance of the first machine learning model based algorithm to perform beam prediction inference by the first user device is within a second threshold level of performance to a performance of either the non-machine learning model based algorithm or the different machine learning model based algorithm to perform beam prediction inference, wherein the one or more corresponding conditions within the threshold for the first user device and one or more other user devices comprise:

the first user device is of a same device model or is manufactured by a same device vendor as the one or more other user devices;

the first user device has a location that is within a threshold distance to a location of the one or more other user devices;

there is a spatial correlation of a channel, within a first threshold, for the first user device and the one or more other user devices;

there is a correlation, within a second threshold, of reference signal measurements of the first user device and reference signal measurements of the one or more other user devices; and the first user device and the one or more other user devices exhibit a same channel propagation characteristics, within a third threshold, including received power and phase shift, for received reference signals;

detect, by the first user device, beam change dynamics event information associated with a change in a beam selection for the first user device;

control transmitting, by the first user device to the network node, the beam change dynamics event information associated with a change in a beam selection for the first user device; and control transmitting, by the first user device to the network node, information indicating a mapping between values of at least one field of a message and a plurality of algorithms that may be used by the first user device to perform beam prediction inference or beam selection.

* * * * *